US009245411B2

(12) United States Patent
Vann et al.

(10) Patent No.: US 9,245,411 B2
(45) Date of Patent: Jan. 26, 2016

(54) WAGERING GAME HAVING GAME ASSETS WITH MULTIPLE LEVELS OF ENHANCEMENT

(71) Applicant: WMS Gaming Inc., Waukegan, IL (US)

(72) Inventors: Jamie W. Vann, Chicago, IL (US); Alexander J. Gobe, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 276 days.

(21) Appl. No.: 13/947,634

(22) Filed: Jul. 22, 2013

(65) Prior Publication Data

US 2013/0310147 A1 Nov. 21, 2013

Related U.S. Application Data

(62) Division of application No. 12/939,783, filed on Nov. 4, 2010, now Pat. No. 8,506,390.

(51) Int. Cl.

| | |
|---|---|
| ***G06F 17/00*** | (2006.01) |
| ***G07F 17/32*** | (2006.01) |
| ***G07F 17/34*** | (2006.01) |

(52) U.S. Cl.

CPC ............ *G07F 17/3244* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 4,624,459 | A | 11/1986 | Kaufman |
| 4,837,728 | A | 6/1989 | Barrie et al. |
| 4,861,041 | A | 8/1989 | Jones et al. |
| 4,948,134 | A | 8/1990 | Suttle et al. |
| 5,116,055 | A | 5/1992 | Tracy |
| 5,249,800 | A | 10/1993 | Hilgendorf et al. |
| 5,275,400 | A | 1/1994 | Weingardt |
| 5,280,909 | A | 1/1994 | Tracy |
| 5,344,144 | A | 9/1994 | Canon |
| 5,377,973 | A | 1/1995 | Jones et al. |
| 5,393,057 | A | 2/1995 | Marnell, II |

(Continued)

FOREIGN PATENT DOCUMENTS

| | | |
|---|---|---|
| CA | 2334546 | 8/2001 |
| DE | 19515983 | 11/1996 |

(Continued)

OTHER PUBLICATIONS

Article for "Easy Riches" by Sigma Game, Strictly Slots; Aug. 2001, 1 page.

(Continued)

*Primary Examiner* — Paul A D'Agostino

(74) *Attorney, Agent, or Firm* — Nixon Peabody LLP

(57) ABSTRACT

A gaming system includes an input device, at least one display, and at least one controller. The input device receives a wager input for playing a wagering game. The at least one display displays a basic wagering game and a community bonus game. The at least one controller is operative to provide a player with a bonus-game asset that is usable in at least a first play of the community bonus game. The bonus-game asset is capable of having at least a first level and a second level that provides a higher bonus-game enhancement than the first level. The at least one controller is further operative to determine if that the bonus-game asset is available to the player for use in a second play of the community bonus game and to alter the level of the bonus-game asset from the first level to the second level for use in the second play.

18 Claims, 17 Drawing Sheets

(56) References Cited

U.S. PATENT DOCUMENTS 5,417,430 A 5/1995 Breeding
5,482,289 A 1/1996 Weingardt
5,524,888 A 6/1996 Heidel
5,554,892 A 9/1996 Norimatsu
5,564,700 A 10/1996 Celona
5,577,731 A 11/1996 Jones
5,577,959 A 11/1996 Takemoto
5,580,063 A 12/1996 Edwards
5,580,309 A 12/1996 Piechowiak et al.
5,611,730 A 3/1997 Weiss
5,645,486 A 7/1997 Nagao et al.
5,647,592 A 7/1997 Gerow
5,655,961 A 8/1997 Acres et al.
5,722,890 A 3/1998 Libby et al.
5,743,800 A 4/1998 Huard et al.
5,766,076 A 6/1998 Pease et al.
RE35,864 E 7/1998 Weingardt
5,779,549 A 7/1998 Walker et al.
5,810,359 A * 9/1998 Wilkins et al. ................ 273/256
5,816,918 A 10/1998 Kelly et al.
5,820,459 A 10/1998 Acres et al.
5,823,874 A 10/1998 Adams
5,830,063 A 11/1998 Byrne
5,839,956 A 11/1998 Takemoto
5,848,932 A 12/1998 Adams
5,851,011 A 12/1998 Lott
5,851,147 A 12/1998 Stupak
5,855,515 A 1/1999 Pease et al.
5,876,284 A 3/1999 Acres et al.
5,885,158 A 3/1999 Torango et al.
5,941,773 A 8/1999 Harlick
5,944,606 A 8/1999 Gerow
5,951,011 A 9/1999 Potter et al.
5,975,528 A 11/1999 Halaby
5,993,316 A 11/1999 Coyle et al.
6,000,699 A 12/1999 Long
6,003,013 A 12/1999 Boushy et al.
6,007,427 A 12/1999 Wiener et al.
6,012,982 A 1/2000 Piechowiak et al.
6,020,884 A 2/2000 MacNaughton et al.
6,032,955 A 3/2000 Luciano et al.
6,039,648 A 3/2000 Guinn et al.
6,047,963 A 4/2000 Pierce et al.
6,077,162 A 6/2000 Weiss
6,089,976 A 7/2000 Schneider et al.
6,089,977 A 7/2000 Bennett
6,089,980 A 7/2000 Gauselmann
6,102,474 A 8/2000 Daley
6,102,798 A 8/2000 Bennett
6,102,799 A 8/2000 Stupak
6,105,964 A 8/2000 Maahs
6,110,043 A 8/2000 Olsen
6,139,013 A 10/2000 Pierce et al.
6,142,872 A 11/2000 Walker et al.
6,146,273 A 11/2000 Olsen
6,155,925 A 12/2000 Giobbi et al.
6,158,741 A 12/2000 Koelling
6,159,097 A 12/2000 Gura
6,168,155 B1 1/2001 Kuhlman et al.
6,168,523 B1 1/2001 Piechowiak et al.
6,203,010 B1 3/2001 Jorasch et al.
6,203,429 B1 3/2001 Demar et al.
6,206,374 B1 3/2001 Jones
6,206,782 B1 3/2001 Walker et al.
6,210,275 B1 4/2001 Olsen
6,210,277 B1 4/2001 Stefan
6,217,448 B1 4/2001 Olsen
6,220,593 B1 4/2001 Pierce et al.
6,224,482 B1 5/2001 Bennett
6,224,484 B1 5/2001 Okuda et al.
6,231,445 B1 5/2001 Acres
6,241,608 B1 6/2001 Torango
6,254,483 B1 7/2001 Acres
6,280,328 B1 8/2001 Holch
6,299,533 B1 10/2001 Parra et al.
6,311,976 B1 * 11/2001 Yoseloff et al. ............ 273/138.2
6,312,232 B1 11/2001 Mori et al.
6,312,332 B1 11/2001 Walker et al.
6,315,660 B1 * 11/2001 DeMar et al. .................. 463/16
6,319,125 B1 11/2001 Acres
6,319,127 B1 11/2001 Walker et al.
6,331,148 B1 12/2001 Krause et al.
6,336,857 B1 1/2002 McBride
6,336,859 B2 1/2002 Jones et al.
6,336,862 B1 1/2002 Byrne
6,345,824 B1 2/2002 Selitzky
6,347,996 B1 2/2002 Gilmore et al.
6,352,479 B1 3/2002 Sparks, II
6,358,149 B1 3/2002 Schneider et al.
6,361,441 B1 3/2002 Walker et al.
6,364,768 B1 4/2002 Acres et al.
6,375,567 B1 4/2002 Acres
6,375,568 B1 4/2002 Roffman et al.
6,406,369 B1 6/2002 Baerlocher et al.
6,409,602 B1 6/2002 Wiltshire et al.
6,416,408 B2 7/2002 Tracy et al.
6,416,409 B1 7/2002 Jordan
6,422,940 B1 7/2002 Walker et al.
6,431,983 B2 8/2002 Acres
6,435,510 B2 8/2002 Moore
6,435,968 B1 8/2002 Torango
6,439,995 B1 8/2002 Hughs-Baird et al.
6,482,089 B2 11/2002 DeMar et al.
6,506,117 B2 1/2003 DeMar et al.
6,507,709 B2 1/2003 Hirai et al.
6,508,707 B2 1/2003 DeMar et al.
6,517,433 B2 2/2003 Loose et al.
6,520,855 B2 2/2003 DeMar et al.
6,569,016 B1 5/2003 Baerlocher
6,577,733 B1 6/2003 Charrin
6,589,115 B2 7/2003 Walker et al.
6,592,458 B1 7/2003 Ho
6,592,460 B2 7/2003 Torango
6,599,186 B1 7/2003 Walker et al.
6,599,188 B2 7/2003 Hirsch et al.
6,599,193 B2 7/2003 Baerlocher et al.
6,601,771 B2 8/2003 Charrin
6,609,673 B1 8/2003 Johnson
6,626,758 B1 9/2003 Parham et al.
6,648,753 B1 11/2003 Tracy et al.
6,648,762 B2 11/2003 Walker et al.
6,652,378 B2 11/2003 Cannon et al.
6,656,052 B2 12/2003 Abramopoulos et al.
6,676,513 B2 1/2004 Gauselmann
6,685,560 B1 2/2004 Hughes
6,692,353 B2 2/2004 Walker et al.
6,712,695 B2 3/2004 Mothwurf et al.
6,712,699 B2 3/2004 Walker et al.
6,733,390 B2 5/2004 Walker et al.
6,776,715 B2 8/2004 Price
6,790,141 B2 9/2004 Muir
6,793,575 B2 * 9/2004 Brown et al. ..................... 463/6
6,837,793 B2 1/2005 McClintic
6,869,361 B2 3/2005 Sharpless
6,880,824 B2 4/2005 Thiinnes
6,887,154 B1 5/2005 Luciano, Jr. et al.
6,887,159 B2 5/2005 Leen et al.
7,004,466 B2 2/2006 Gauselmann
7,036,012 B2 4/2006 Charrin
7,056,215 B1 6/2006 Olive
7,255,645 B2 8/2007 Steil et al.
2002/0006822 A1 1/2002 Krintzman
2002/0132660 A1 9/2002 Taylor
2002/0138594 A1 9/2002 Rowe
2002/0151345 A1 10/2002 Byrne
2002/0155874 A1 10/2002 Byrne
2002/0187823 A1 12/2002 Khal
2003/0014370 A1 1/2003 Charrin
2003/0027618 A1 2/2003 Byrne
2003/0027625 A1 2/2003 Rowe
2003/0030211 A1 2/2003 Brown
2003/0036430 A1 2/2003 Cannon
2003/0045337 A1 3/2003 Byrne
2003/0045354 A1 3/2003 Giobbi

(56) References Cited

U.S. PATENT DOCUMENTS

| | | | | |
|---|---|---|---|---|
| 2003/0047874 | A1 | 3/2003 | Leen et al. | |
| 2003/0050106 | A1 | 3/2003 | Lyfoung | |
| 2003/0060106 | A1 | 3/2003 | Haggquist et al. | |
| 2003/0060266 | A1 | 3/2003 | Baerlocher | |
| 2003/0064776 | A1 | 4/2003 | Byrne | |
| 2003/0064807 | A1 | 4/2003 | Walker | |
| 2003/0078091 | A1 | 4/2003 | Brandstetter et al. | |
| 2003/0100361 | A1* | 5/2003 | Sharpless et al. | 463/25 |
| 2003/0104853 | A1* | 6/2003 | Tessmer et al. | 463/16 |
| 2003/0109306 | A1 | 6/2003 | Karmarkar | |
| 2003/0114218 | A1 | 6/2003 | McClintic | |
| 2003/0119576 | A1 | 6/2003 | McClintic | |
| 2003/0148807 | A1 | 8/2003 | Acres | |
| 2003/0148808 | A1 | 8/2003 | Price | |
| 2003/0157978 | A1 | 8/2003 | Englman | |
| 2003/0181231 | A1 | 9/2003 | Vancura et al. | |
| 2003/0186733 | A1 | 10/2003 | Wolf et al. | |
| 2003/0211884 | A1 | 11/2003 | Gauselmann | |
| 2003/0216166 | A1 | 11/2003 | Baerlocher et al. | |
| 2003/0222402 | A1 | 12/2003 | Olive | |
| 2003/0224852 | A1 | 12/2003 | Walker | |
| 2003/0228899 | A1 | 12/2003 | Evans | |
| 2003/0236116 | A1 | 12/2003 | Marks et al. | |
| 2004/0009808 | A1 | 1/2004 | Gauselmann | |
| 2004/0009811 | A1 | 1/2004 | Torango | |
| 2004/0023716 | A1 | 2/2004 | Gauselmann | |
| 2004/0038741 | A1 | 2/2004 | Gauselmann | |
| 2004/0048644 | A1 | 3/2004 | Gerrard et al. | |
| 2004/0063484 | A1 | 4/2004 | Dreaper et al. | |
| 2004/0087368 | A1 | 5/2004 | Gauselmann | |
| 2004/0092304 | A1 | 5/2004 | George | |
| 2004/0102238 | A1 | 5/2004 | Taylor | |
| 2004/0102243 | A1 | 5/2004 | Olsen | |
| 2004/0106448 | A1 | 6/2004 | Gauselmann | |
| 2004/0132524 | A1 | 7/2004 | Ramstad et al. | |
| 2004/0152511 | A1 | 8/2004 | Nicely et al. | |
| 2004/0176157 | A1* | 9/2004 | Walker et al. | 463/16 |
| 2004/0192432 | A1* | 9/2004 | Walker et al. | 463/20 |
| 2004/0204226 | A1 | 10/2004 | Foster et al. | |
| 2004/0204235 | A1 | 10/2004 | Walker et al. | |
| 2004/0235552 | A1 | 11/2004 | Gauselmann | |
| 2004/0242297 | A1 | 12/2004 | Walker et al. | |
| 2004/0242303 | A1 | 12/2004 | Walker et al. | |
| 2004/0248651 | A1 | 12/2004 | Gagner et al. | |
| 2005/0003880 | A1 | 1/2005 | Englman et al. | |
| 2005/0003886 | A1 | 1/2005 | Englman et al. | |
| 2005/0014554 | A1 | 1/2005 | Walker | |
| 2005/0017451 | A1 | 1/2005 | Ollington | |
| 2005/0026674 | A1 | 2/2005 | Wolf et al. | |
| 2005/0037837 | A1 | 2/2005 | Rowe | |
| 2005/0055113 | A1 | 3/2005 | Gauselmann | |
| 2005/0059467 | A1 | 3/2005 | Saffari et al. | |
| 2005/0059472 | A1 | 3/2005 | Joshi et al. | |
| 2005/0064930 | A1 | 3/2005 | Jubinville et al. | |
| 2005/0075889 | A1 | 4/2005 | Gomes et al. | |
| 2005/0096130 | A1 | 5/2005 | Mullins | |
| 2005/0137010 | A1 | 6/2005 | Enzminger et al. | |
| 2005/0148382 | A1 | 7/2005 | Fox | |
| 2005/0159207 | A1 | 7/2005 | Thomas | |
| 2005/0187008 | A1 | 8/2005 | Nakajima | |
| 2005/0187014 | A1 | 8/2005 | Saffari et al. | |
| 2005/0192073 | A1 | 9/2005 | Nakajima | |
| 2005/0192088 | A1 | 9/2005 | Hartman et al. | |
| 2005/0215313 | A1 | 9/2005 | O'Halloran | |
| 2005/0282628 | A1 | 12/2005 | Beatty | |
| 2006/0003829 | A1 | 1/2006 | Thomas | |
| 2006/0009280 | A1 | 1/2006 | Joshi et al. | |
| 2006/0009283 | A1* | 1/2006 | Englman et al. | 463/29 |
| 2006/0019737 | A1 | 1/2006 | Yang | |
| 2006/0019744 | A1 | 1/2006 | Roemer | |
| 2006/0025195 | A1 | 2/2006 | Pennington et al. | |
| 2006/0025210 | A1 | 2/2006 | Johnson | |
| 2006/0030403 | A1 | 2/2006 | Lafky et al. | |
| 2006/0035706 | A1 | 2/2006 | Thomas et al. | |
| 2006/0052159 | A1 | 3/2006 | Cahill et al. | |
| 2006/0073877 | A1 | 4/2006 | Rodgers et al. | |
| 2006/0073887 | A1 | 4/2006 | Nguyen et al. | |
| 2006/0073889 | A1 | 4/2006 | Edidin et al. | |
| 2006/0116194 | A1* | 6/2006 | Pacey et al. | 463/20 |
| 2006/0116201 | A1 | 6/2006 | Gauselmann | |
| 2006/0121971 | A1 | 6/2006 | Slomiany | |
| 2006/0135243 | A1 | 6/2006 | Englman et al. | |
| 2006/0142079 | A1 | 6/2006 | Ikehara et al. | |
| 2006/0142086 | A1 | 6/2006 | Blackburn et al. | |
| 2006/0154718 | A1 | 7/2006 | Willyard et al. | |
| 2006/0178203 | A1 | 8/2006 | Hughes et al. | |
| 2006/0183535 | A1 | 8/2006 | Marks et al. | |
| 2006/0183537 | A1 | 8/2006 | Dickerson | |
| 2006/0183538 | A1 | 8/2006 | Michaelson et al. | |
| 2006/0281527 | A1 | 12/2006 | Dunaevsky et al. | |
| 2006/0287077 | A1 | 12/2006 | Grav et al. | |
| 2007/0026941 | A1 | 2/2007 | Block et al. | |
| 2007/0054733 | A1 | 3/2007 | Baerlocher | |
| 2007/0060244 | A1 | 3/2007 | Yaldoo et al. | |
| 2007/0060271 | A1 | 3/2007 | Cregan et al. | |
| 2007/0060314 | A1 | 3/2007 | Baerlocher et al. | |
| 2007/0060319 | A1 | 3/2007 | Block et al. | |
| 2007/0060365 | A1 | 3/2007 | Tien et al. | |
| 2007/0060369 | A1* | 3/2007 | Martin | 463/42 |
| 2007/0077979 | A1* | 4/2007 | Cohn et al. | 463/16 |
| 2007/0259706 | A1* | 11/2007 | Anderson et al. | 463/16 |
| 2007/0259711 | A1 | 11/2007 | Thomas | |
| 2007/0259713 | A1* | 11/2007 | Fiden et al. | 463/25 |
| 2008/0113770 | A1* | 5/2008 | Gelber et al. | 463/25 |
| 2008/0254893 | A1* | 10/2008 | Patel et al. | 463/42 |
| 2009/0011824 | A1* | 1/2009 | Englman et al. | 463/25 |
| 2009/0124327 | A1* | 5/2009 | Caputo et al. | 463/20 |
| 2009/0170593 | A1* | 7/2009 | Pacey | 463/25 |
| 2009/0189351 | A1* | 7/2009 | Baerlocher et al. | 273/309 |
| 2010/0004056 | A1* | 1/2010 | Walker et al. | 463/25 |
| 2010/0130276 | A1* | 5/2010 | Fiden et al. | 463/16 |
| 2011/0021260 | A1* | 1/2011 | Adiraju et al. | 463/20 |
| 2011/0028202 | A1* | 2/2011 | Naicker et al. | 463/20 |
| 2011/0092271 | A1* | 4/2011 | Nguyen | 463/25 |

FOREIGN PATENT DOCUMENTS

| | | |
|---|---|---|
| DE | 19624321 | 1/1998 |
| EP | 0521599 | 1/1993 |
| GB | 2153572 | 8/1985 |
| GB | 2181589 | 4/1987 |
| GB | 2242300 | 9/1991 |
| GB | 2313792 | 12/1997 |
| GB | 2333880 | 8/1999 |
| GB | 2350715 | 12/2000 |
| WO | 99/03078 | 1/1999 |
| WO | 99/15246 | 4/1999 |
| WO | 99/19037 | 4/1999 |
| WO | 01/33478 | 5/2001 |
| WO | 03/026754 | 4/2003 |
| WO | 03/083789 | 10/2003 |
| WO | 2005/113088 | 12/2005 |
| WO | 2006/014770 | 2/2006 |
| WO | 2006/014990 | 2/2006 |
| WO | 2006/039349 | 4/2006 |
| WO | 2007/089410 | 8/2007 |
| WO | 2007/117502 | 10/2007 |

OTHER PUBLICATIONS

Article for "Millioniser" by Glenn Haussman, Strictly Slots; Mar. 2004, 4 pages.

Product Sheet for "Big Games Safari," IGT; 2000; 24 pages.

"New '97 Games," International Gaming & Wagering Business; Mar. 1997; 24 pages.

* cited by examiner

WAGERING GAME HAVING GAME ASSETS WITH MULTIPLE LEVELS OF ENHANCEMENT

CROSS REFERENCE TO RELATED APPLICATIONS

This application is a divisional of prior application Ser. No. 12/939,783, filed Nov. 4, 2010, now allowed, which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to gaming apparatuses having game assets with multiple levels of enhancement.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

SUMMARY OF THE INVENTION

According to one aspect of the present disclosure, a method of conducting a wagering game having a basic game providing access to a community bonus game includes receiving, via at least one input device, a wager from a player to play the basic game. The basic game includes a plurality of randomly selected outcomes. At least one of the randomly selected outcomes is a bonus-game-asset outcome. In response to the player achieving the bonus-game-asset outcome in the basic game, the player is provided, via one or more processors, with a bonus-game asset that is usable in the community bonus game. The bonus-game asset is capable of having at least a first level and a second level. The second level provides a higher bonus-game enhancement than the first level. In response to a bonus-game triggering condition, a first play of the community bonus game is conducted, via the one or more processors, in which the bonus-game asset at the first level is used by the player. The bonus-game asset is either available or unavailable to the player for use in a second play of the community bonus game based on a random outcome of the first play of the community bonus game. In response to the bonus-game asset being available to the player for use in the second play of the community bonus game, the level of the bonus-game asset is altered, via the one or more processors, from the first level to the second level such that the bonus-game asset is usable in the second play of the community bonus game at the second level.

According to another aspect of the present disclosure, a method of conducting a community bonus game is described.

The community bonus game permits a player to use a bonus-game asset to modify a bonus game award. In response to a bonus-game triggering condition, a first play of the community bonus game is displayed on at least one display including the bonus-game asset of the player. The bonus game asset is used by the player of the community bonus game at a first level during the first play. A determination is made, based on a random outcome from at least one processor, whether the bonus-game asset is available or unavailable to the player for use in a second play of the community bonus game. In response to the bonus-game asset being available to the player for use in the second play of the community bonus game, the level of the bonus-game asset is altered from the first level to a second level. In response to another bonus-game triggering condition, a second play of the community bonus game is displayed on the at least one display including the bonus-game asset of the player. The bonus-game asset is used by the player of the community bonus game at the second level during the second play. The second level provides a higher bonus-game enhancement than the first level.

According to yet another aspect of the present disclosure, a method of conducting a wagering game having a basic game providing access to a community bonus game includes a wager is received, via at least one input device, from a player to play the basic game. The basic game includes a plurality of randomly selected outcomes. The randomly selected outcomes include at least one bonus-game-asset outcome. In response to the player achieving the at least one bonus-game-asset outcome a first time in the basic game, the player is provided, via one or more processors, with a first portion of a bonus-game asset. The bonus-game asset includes at least the first portion and a second portion that must be collected by the player to use the bonus-game asset. In response to a first bonus-game triggering condition and in response to the player not having collected the at least first and second portions, a first play of the community bonus game is conducted, via the one or more processors, without the player. In response to the player achieving the at least one bonus-game-asset outcome a second time in the basic game, the player is provided, via the one or more processors, with the second portion of the bonus-game asset such that the bonus-game asset is available for use by the player at a first level. In response to a second bonus-game triggering condition and in response to the player having collected the at least first and second portions of the bonus-game asset, a second play of the community bonus game is conducted, via the one or more processors, in which the bonus-game asset is used by the player of the community bonus game at the first level. The bonus-game asset is either available or unavailable to the player for use in a third play of the community bonus game. In response to the bonus-game asset being available to the player for use in the third play of the community bonus game, the level of the bonus-game asset is altered, via the one or more processors, from the first level to a second level such that the bonus-game asset is usable in the third play of the community bonus game at the second level. The second level provides a higher bonus-game enhancement than the first level.

According to one aspect of the present disclosure, a gaming system for playing a wagering game having a basic game providing access to a community bonus game includes an input device, at least one display, and at least one controller. The input device is for receiving a wager input for playing the wagering game. The at least one display is for displaying the basic game and the community bonus game. The at least one controller is coupled to the display and operative to provide a player with a bonus-game asset that is usable in the community bonus game. The bonus-game asset is capable of having at least a first level and a second level. The second level provides a higher bonus-game enhancement than the first level. The at least one controller is further operative to determine that the bonus-game asset is available to the player for use in a second play of the community bonus game and to alter the level of the bonus-game asset from the first level to the second level such that the bonus-game asset is usable in the second play of the community bonus game at the second level.

According to yet another aspect of the present disclosure, non-transitory computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
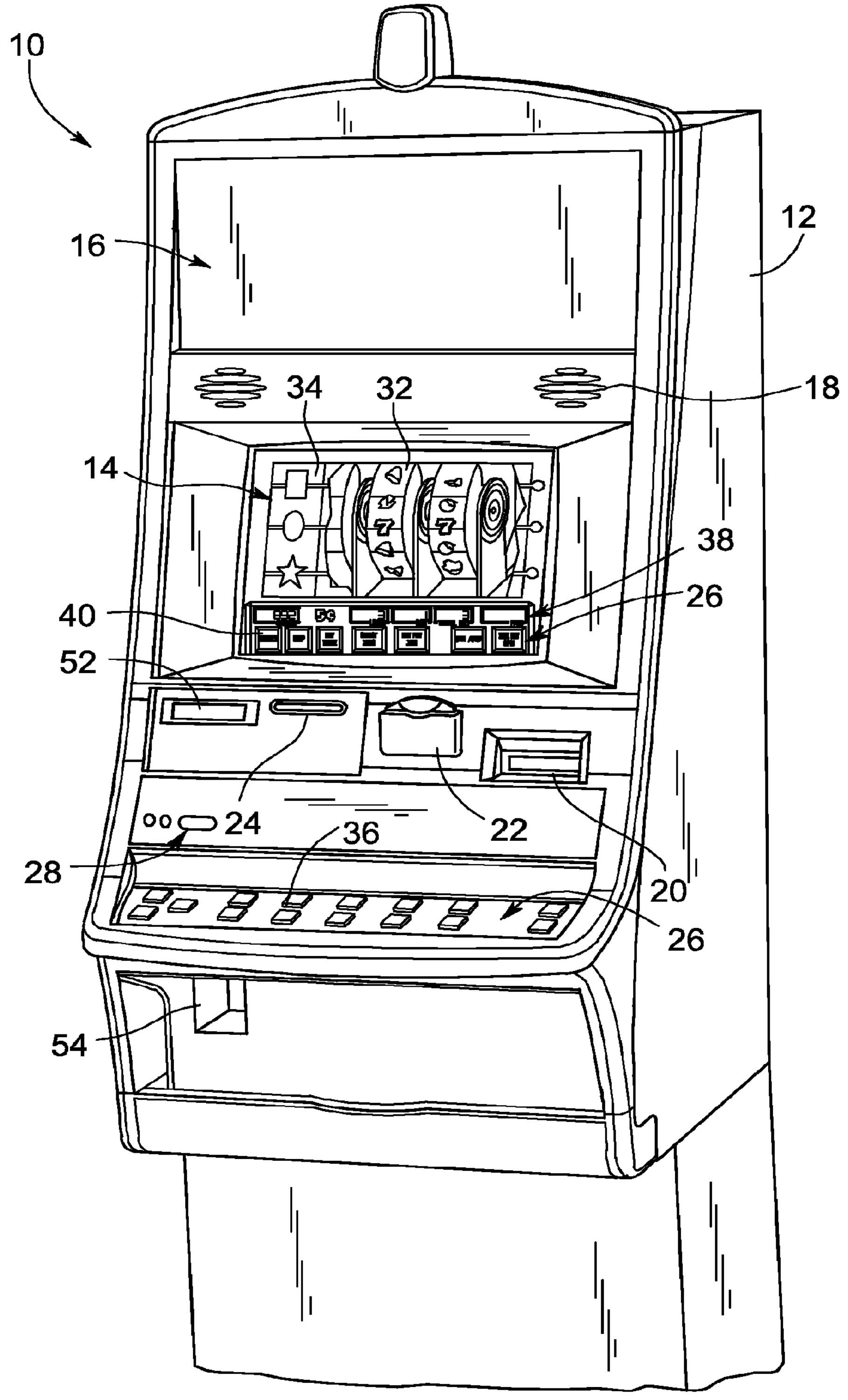
FIG. 1 (PRIOR ART)
FIG. 1 is a perspective view of a free-standing gaming terminal according to an embodiment of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
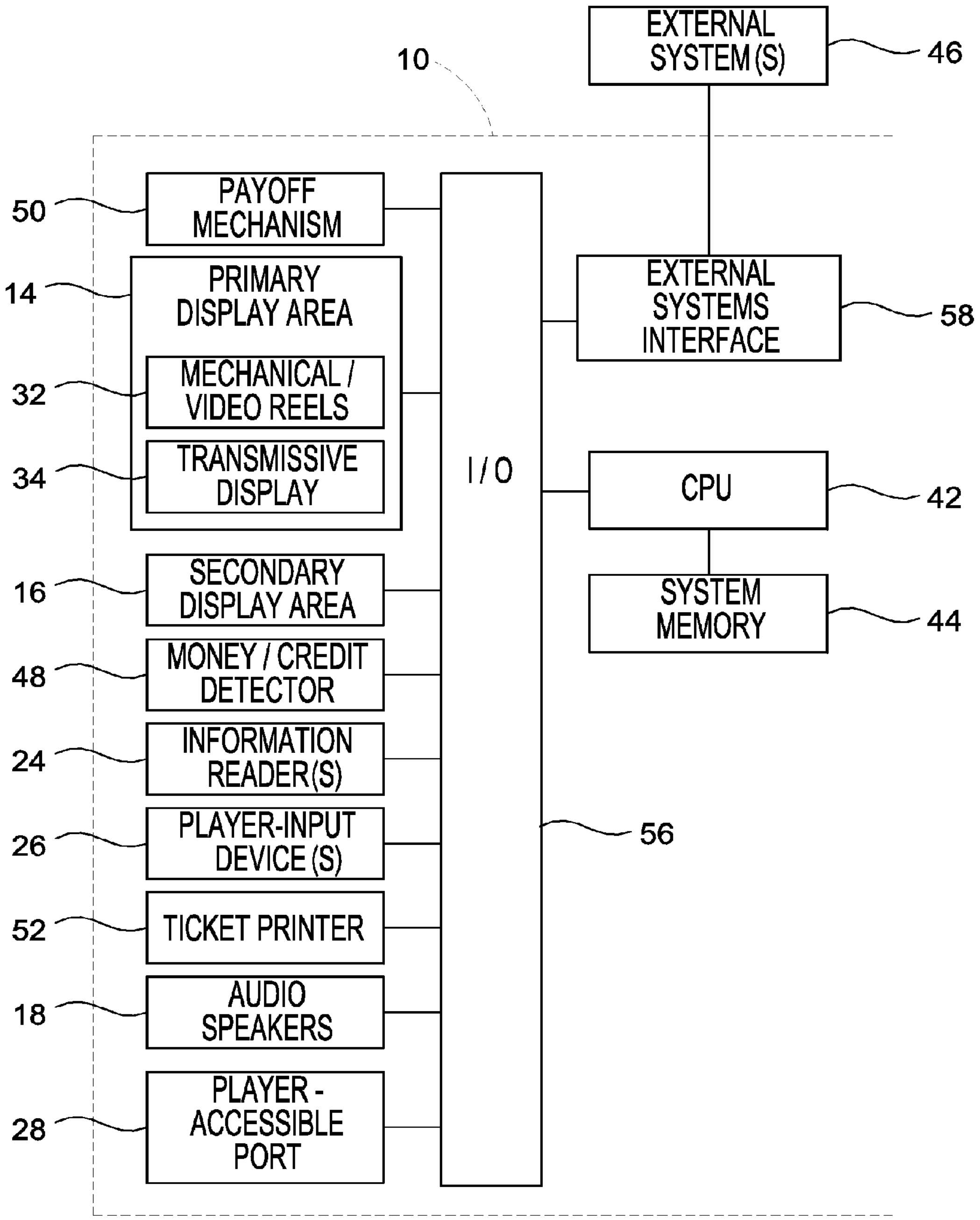
FIG. 2 (PRIOR ART)
FIG. 2 is a schematic view of a gaming system according to an embodiment of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the basic wagering game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10 bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
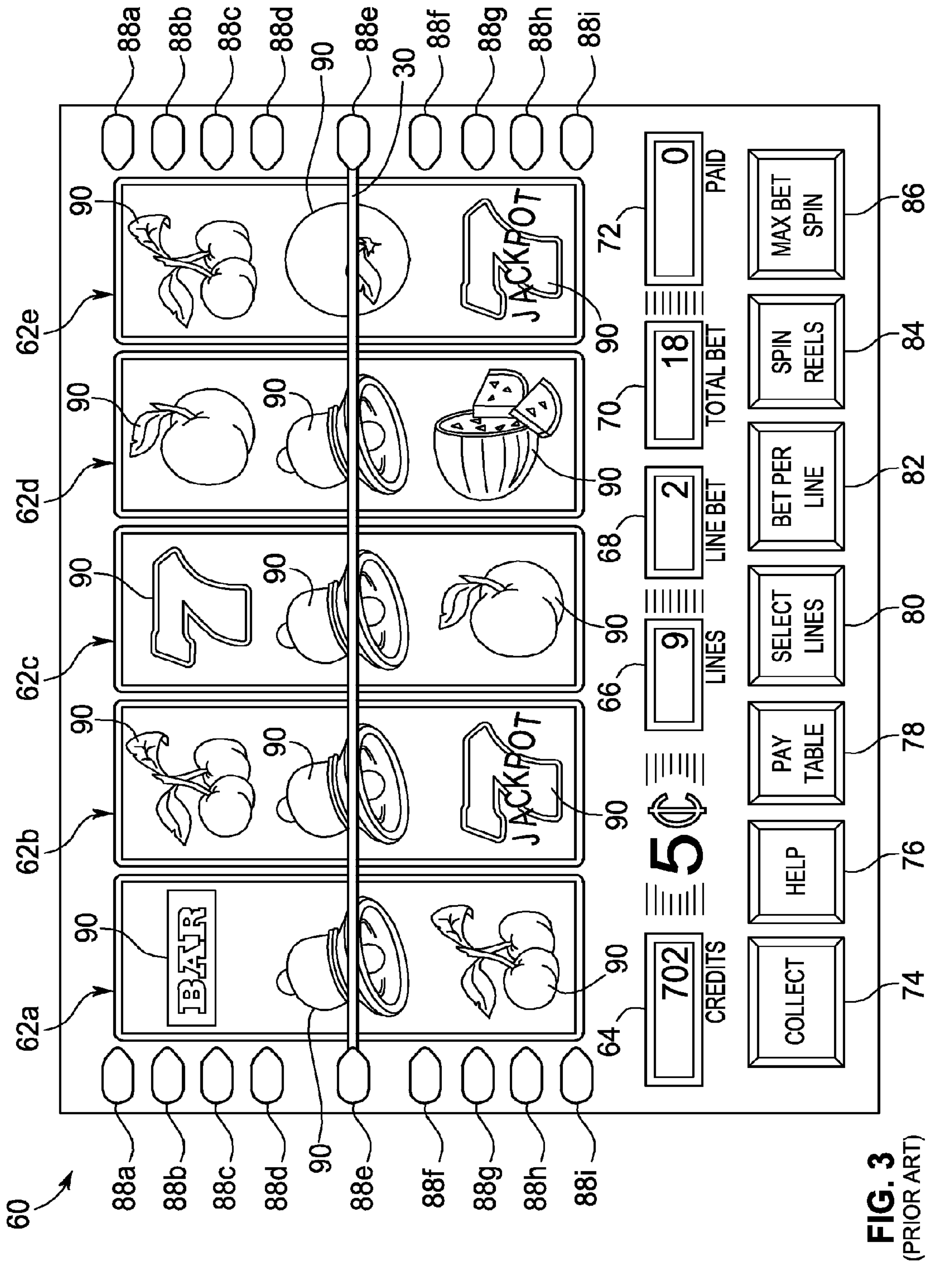
FIG. 3 (PRIOR ART)
FIG. 3 is an image of an exemplary base-game screenshot of an exemplary wagering game displayed on a gaming terminal, according to an embodiment of the present disclosure.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
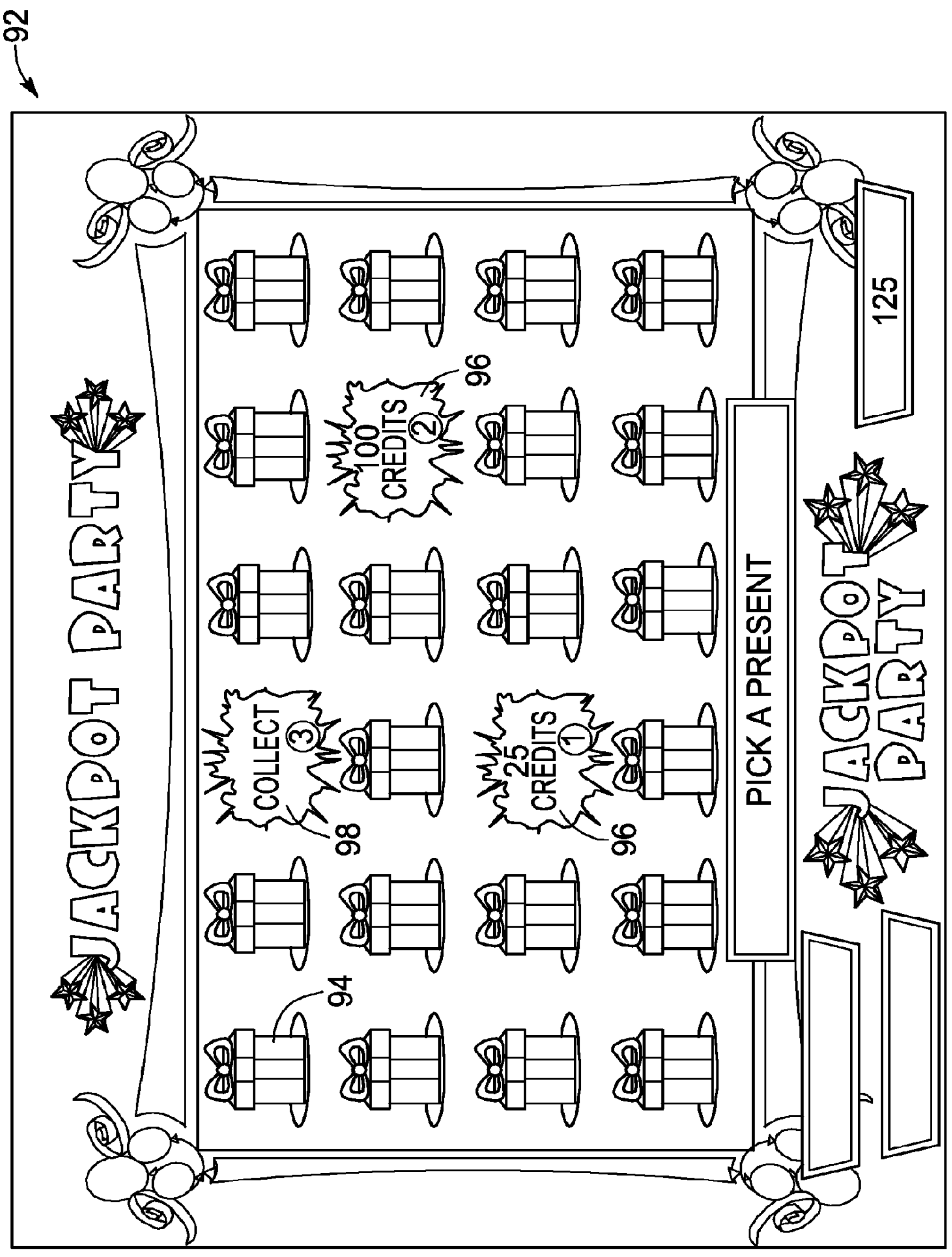
FIG. 4 (PRIOR ART)
FIG. 4 is an image of an exemplary bonus-game screenshot of an exemplary wagering game displayed on a gaming terminal, according to an embodiment of the present disclosure.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
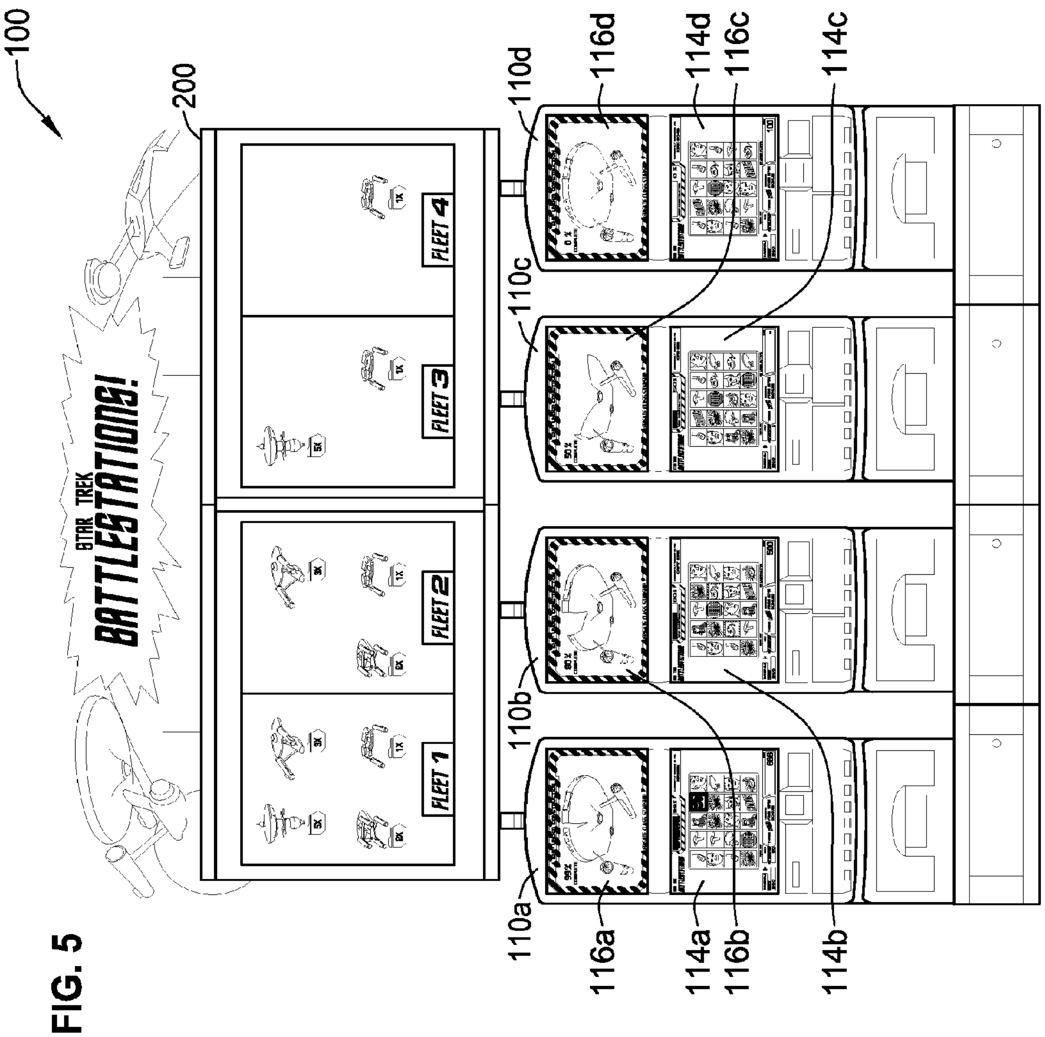
FIG. 5 is a front view of a free-standing gaming system according to an embodiment of the present disclosure.

Referring now to FIG. 5, a gaming system 100 is shown according to aspects of the present disclosure. The gaming system 100 includes four gaming terminals 110*a-d* and an overhead display 200. Each of the gaming terminals 110*a-d* includes a primary display 114*a-d* and a secondary display 116*a-d*, respectively. That is, the first gaming terminal 110*a* includes the primary display 114*a* and the secondary display 116*a*, the second gaming terminal 110*b* includes the primary display 114*b* and the secondary display 116*b*, the third gaming terminal 110*c* includes the primary display 114*c* and the secondary display 116*c*, and the fourth gaming terminal 110*d* includes the primary display 114*d* and the secondary display 116*d*. Both the primary display 114*a-d* and the secondary display 116*a-d* can be used to display various portions of a basic wagering game and/or a community bonus game, as will be explained in detail herein.

FIGS. 6A-D illustrate, respectively, enlarged views of the four primary and the secondary displays 114*a-d* and 116*a-d* of the four gaming terminals 110*a-d* are shown according to some aspects of the present disclosure. Each of the primary and the secondary displays 114*a-d* and 116*a-d* is shown with different screenshots to illustrate different outcomes 120*a-d* of the basic wagering game (primary displays 114*a-d*) and different stages of completion of partially complete bonus-game assets 150*a-d* (secondary displays 116*a-d*).

The basic wagering game is a slot-type wagering game similar to the slot-type wagering game described above in reference to FIG. 3. The basic wagering game is displayed on each of the primary displays 114*a-d*. The basic wagering game portrays a plurality of simulated moveable reels 62*a-e*. A plurality of symbols 90 is displayed on the plurality of reels 62*a-e* to indicate randomly selected outcomes of the basic wagering game. A winning outcome or winning combination typically occur when the displayed symbols 90 correspond to a winning symbol combination listed in a pay table stored in a memory of the gaming terminal 110*a-d* or in an external system (e.g., external system 46) communicatively connected to the gaming terminal 110*a-d*. The winning outcome typically results in a payout or award of credits, coins, or the like, to the player of the gaming terminal 110*a-d*.

Figure 6A:
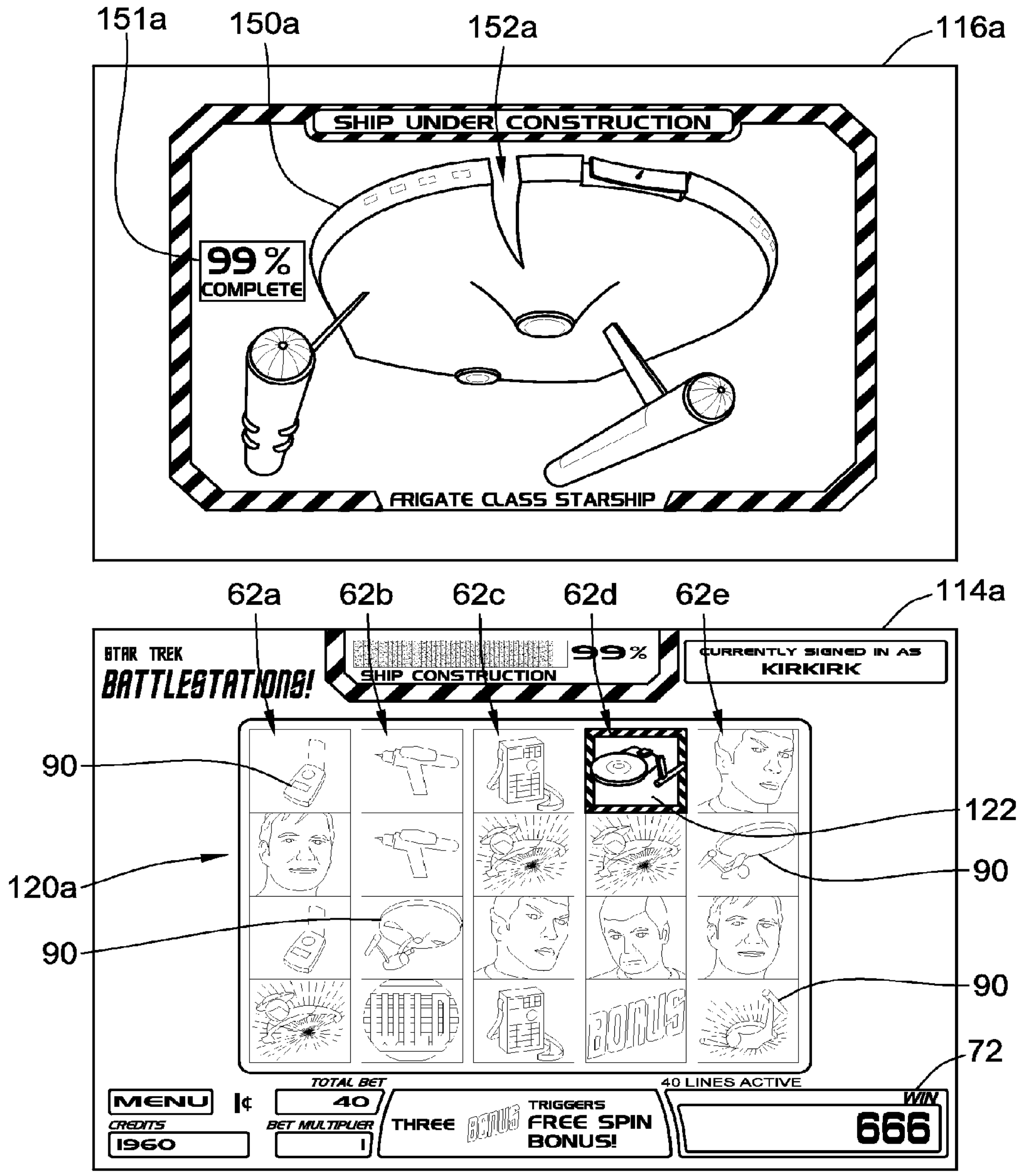
FIG. 6A is an image of an exemplary base-game screenshot on a primary display of a first gaming terminal of the gaming system of FIG. 5 and an exemplary image of a bonus-game asset being constructed on a secondary display of the first gaming terminal of the gaming system of FIG. 5.
Figure 6B:
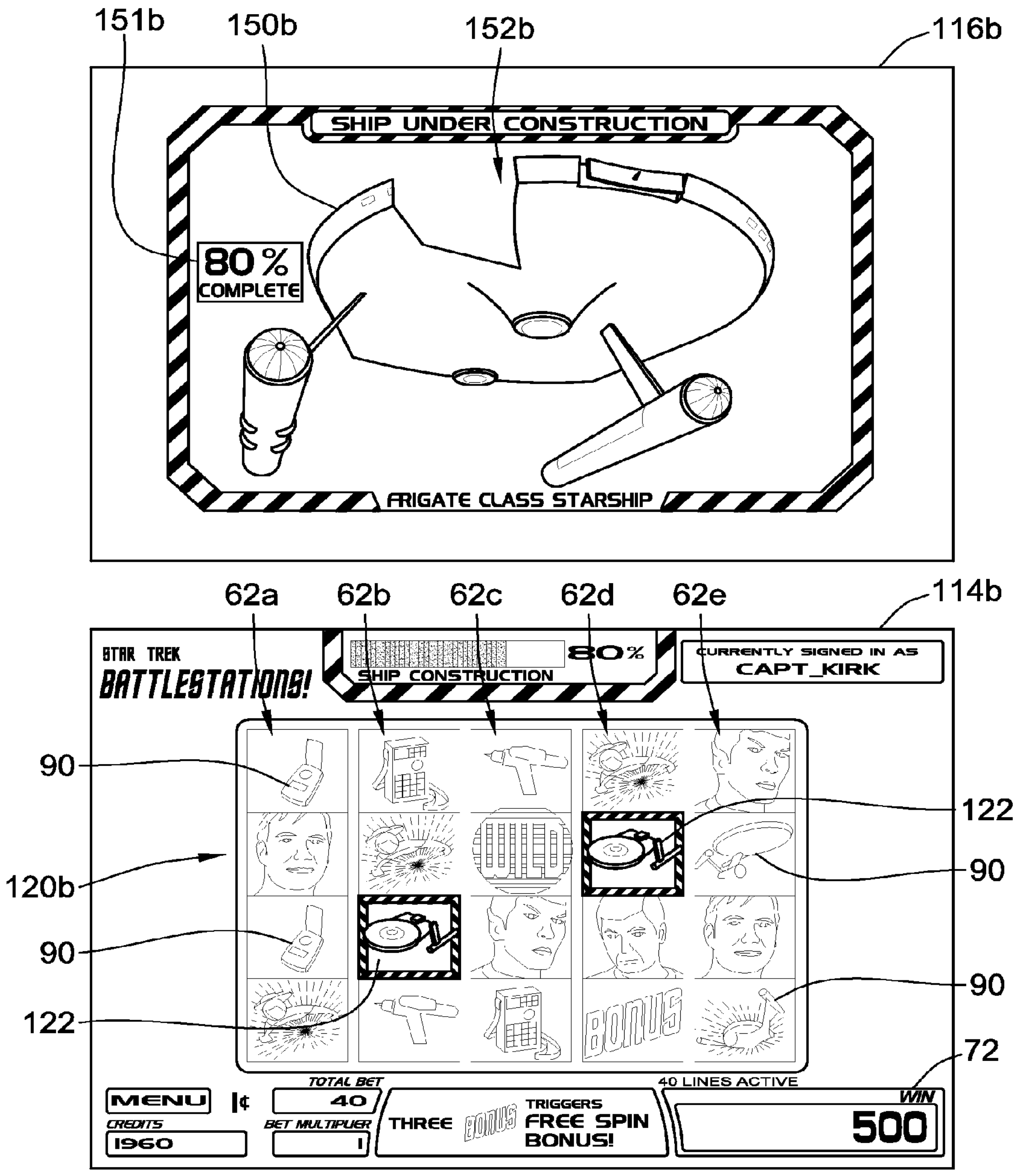
FIG. 6B is an image of an exemplary base-game screenshot on a primary display of a second gaming terminal of the gaming system of FIG. 5 and an exemplary image of a bonus-game asset being constructed on a secondary display of the second gaming terminal of the gaming system of FIG. 5.

The plurality of symbols 90 includes symbols with various graphical representations or animations and one or more bonus-game-asset symbols 122 (FIGS. 6A and 6B). A bonus-game-asset outcome occurs when the displayed symbols 90 include one or more of the bonus-game-asset symbols 122. The bonus-game-asset outcome (e.g., outcomes 120*a*, 120*b* in FIGS. 6A and 6B) results in a player of the basic wagering game of the gaming terminal 110*a,b* being awarded a bonus-game asset or a portion of a bonus-game asset for use in the community bonus game. Thus, the presence of one or more bonus-game-asset symbols 122 in an outcome of the basic wagering game indicates or triggers an award of a bonus-game asset or a portion thereof to a player of the basic wagering game. The occurrence of a bonus-game-asset outcome and/or the occurrence of a winning outcome is randomly determined by one or more processors and/or controllers.

The players of the basic wagering game collect the bonus-game assets for use in the community bonus game as bonus game enhancements. The players also collect the portions of the bonus-game assets to achieve complete bonus-game assets for use in the community bonus game as bonus game enhancements. That is, a player can use bonus-game assets during the community bonus game to enhance the community bonus game, such as, for example, by increasing a bonus game award with a multiplier associated with the bonus-game asset.

Figure 6C:
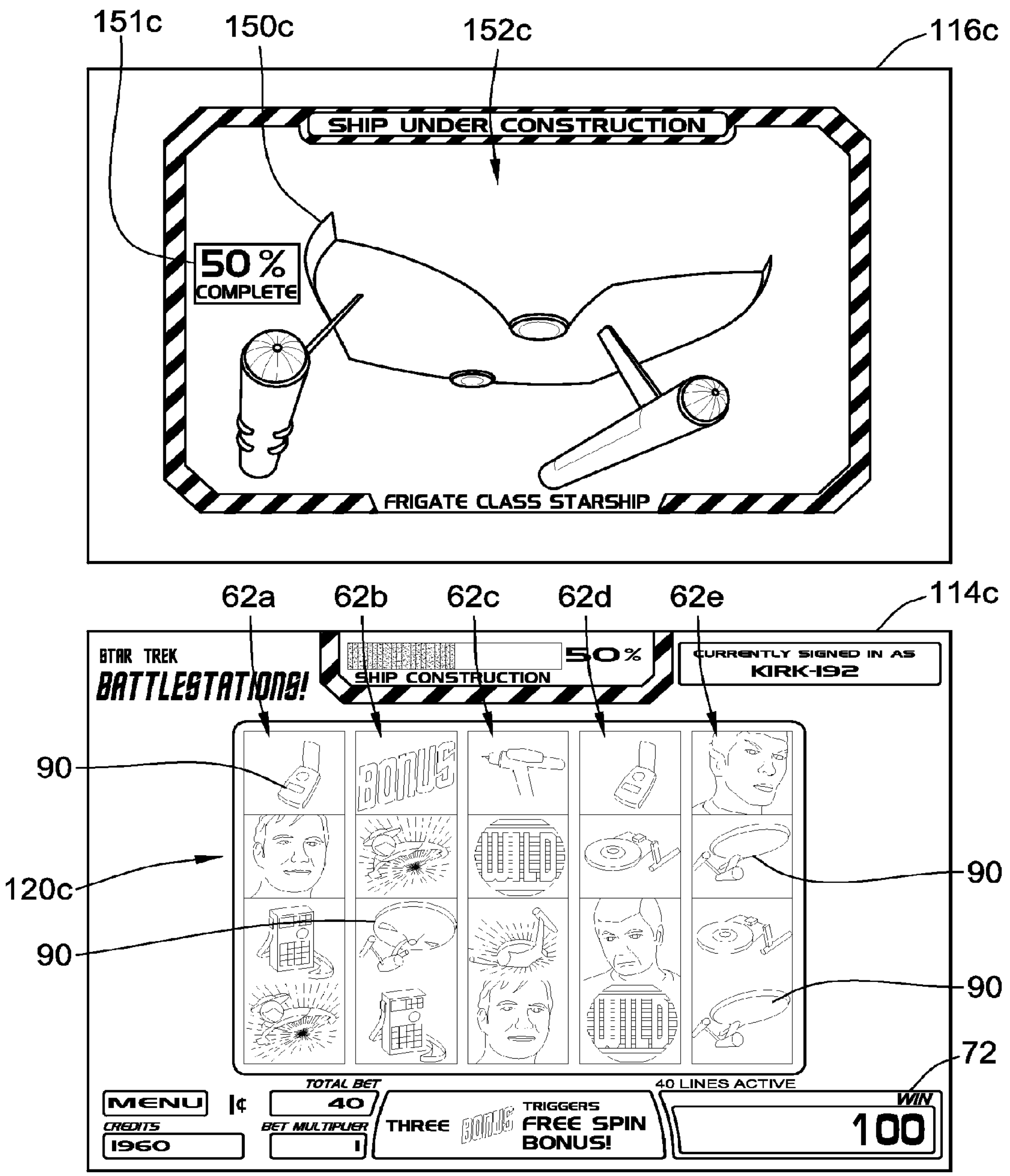
FIG. 6C is an image of an exemplary base-game screenshot on a primary display of a third gaming terminal of the gaming system of FIG. 5 and an exemplary image of a bonus-game asset being constructed on a secondary display of the third gaming terminal of the gaming system of FIG. 5.
Figure 6D:
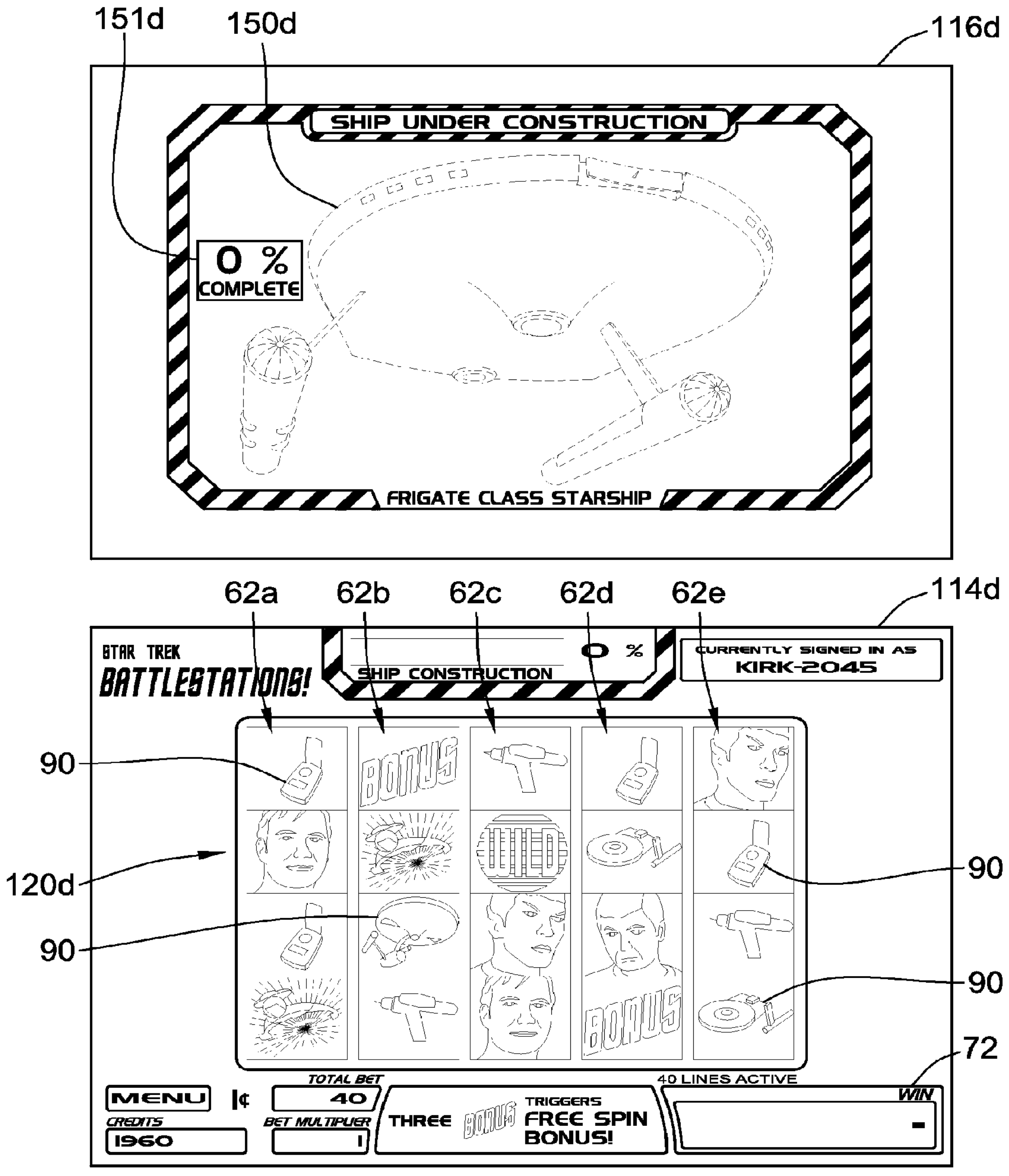
FIG. 6D is an image of an exemplary base-game screenshot on a primary display of a fourth gaming terminal of the gaming system of FIG. 5 and an exemplary image of a bonus-game asset being constructed on a secondary display of the fourth gaming terminal of the gaming system of FIG. 5.
Figure 6E:
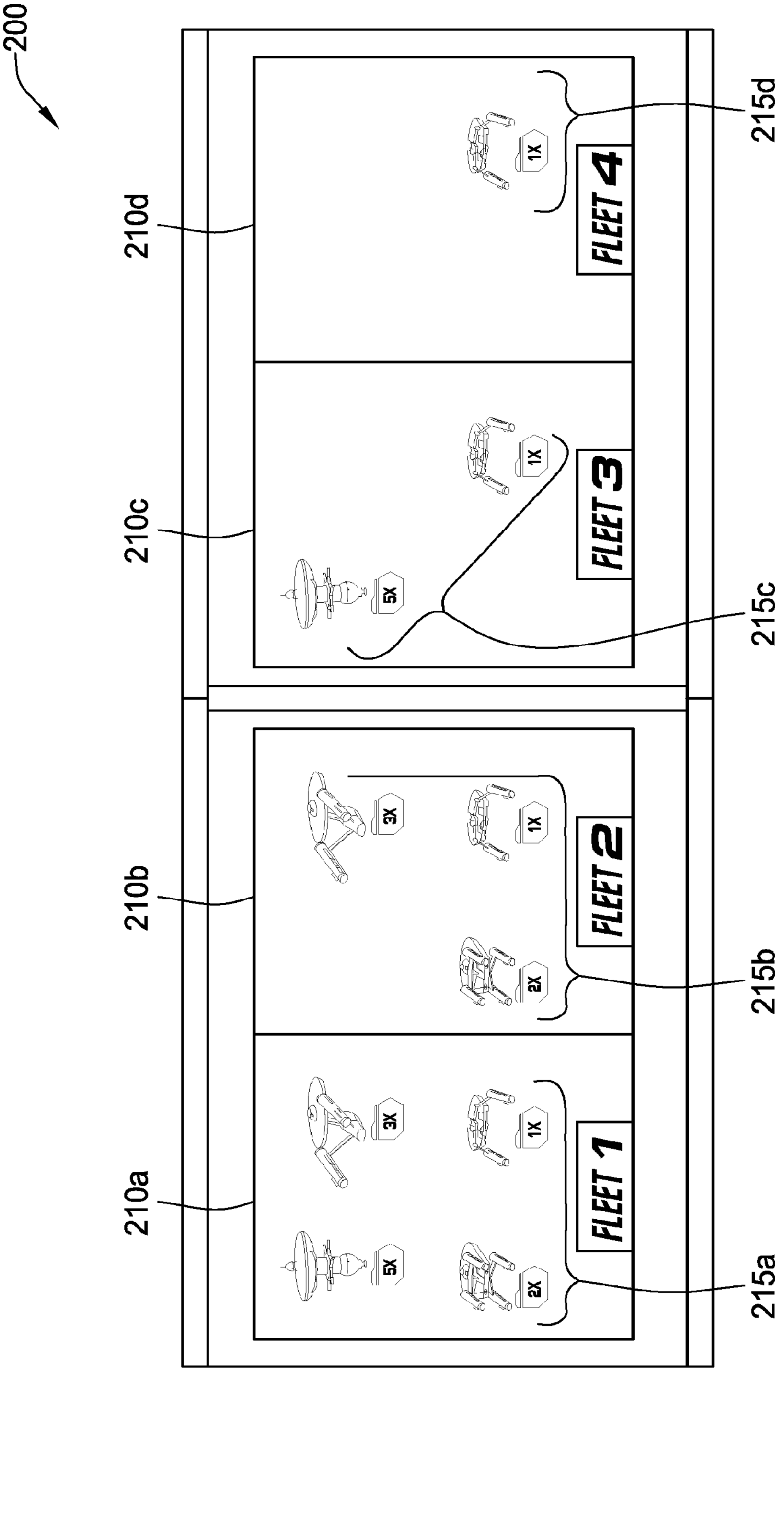
FIG. 6E is an exemplary image of four fleets of bonus-game assets on an overhead display of the gaming system of FIG. 5.

Complete or completed bonus-game assets are collected by the players and stored in a respective inventory or fleet 215*a-d*, which can be represented on the overhead display 200, as shown in FIGS. 5 and 6E and as described herein in reference to FIG. 6E. The awarded portions of the bonus-game assets are also collected by the players until the portions form a complete bonus-game asset (e.g., player achieves a 100% complete bonus-game asset). Representations of partially complete bonus-game assets 150*a-d* are shown on the secondary displays 116*a-d* as a percentage complete of the partially complete bonus-game assets 150*a-d* to illustrate a player's progress towards completing a bonus-game asset. When one of the partially complete bonus-game assets 150*a-d* is complete—all portions are collected—the completed bonus-game asset is moved and/or stored in the respective fleet or inventory 215*a-d*. In order for a player to complete a bonus-game asset, the player will typically collect between 1 and 20 portions of bonus-game assets.

Referring specifically to FIG. 6A, the primary display 114*a* illustrates a randomly selected outcome 120*a* of the basic wagering game which is both a bonus-game-asset outcome and a winning outcome. The secondary display 116*a* displays the partially complete bonus-game asset 150*a*, which illustrates a first player's progress towards completing the partially complete bonus-game asset 150*a*. The outcome 120*a* includes one bonus-game-asset symbol 122. The partially complete bonus-game asset 150*a* is 99% complete as indicated by a percent complete indicator 151*a* and a missing portion 152*a* of the partially complete bonus-game asset 150*a*. As the outcome 120*a* was a winning outcome, it resulted in an award of 666 credits, as shown in the paid meter 72. Additionally, as the outcome 120*a* was a bonus-game-asset outcome, it resulted in an award of a portion of the partially complete bonus-game asset 150*a*. The awarded portion of the partially complete bonus-game asset 150*a* can be indicated by increasing the percent complete indicator 151*a* and/or by modifying the display of the partially complete bonus-game asset 150*a* to display a more complete asset.

Referring specifically to FIG. 6B, the primary display 114*b* illustrates a randomly selected outcome 120*b* of the basic wagering game which is both a bonus-game-asset outcome and a winning outcome. The secondary display 116*b* displays a partially complete bonus-game asset 150*b*, which illustrates a second player's progress towards completing the partially complete bonus-game asset 150*b*. The outcome 120*b* includes two bonus-game-asset symbols 122. The partially complete bonus-game asset 150*b* is 80% complete as indicated by a percent complete indicator 151*b* and a missing portion 152*b* of the partially complete bonus-game asset 150*b*. As the outcome 120*b* was a winning outcome, it resulted in an award of 500 credits, as shown in the paid meter 72. Additionally, as the outcome 120*b* was a bonus-game-asset outcome including two bonus-game-asset symbols 122, it resulted in an award of two portions of the partially complete bonus-game asset 150*b*. Thus, the partially complete bonus-game asset 150*b* and the percent complete indicator 151*b* can be modified to illustrate the awarded portions.

Referring specifically to FIG. 6C, the primary display 114*c* illustrates a randomly selected outcome 120*c* of the basic wagering game which is a winning outcome. The secondary display 116*c* displays a partially complete bonus-game asset 150*c*, which illustrates a third player's progress towards completing the partially complete bonus-game asset 150*c*. The partially complete bonus-game asset 150*c* is 50% complete as indicated by a percent complete indicator 151*c* and a missing portion 152*c* of the partially complete bonus-game asset 150*c*. As the outcome 120*c* was a winning outcome, it resulted in an award of 100 credits, as shown in the paid meter 72. Additionally, as the outcome 120*c* was not a bonus-game-asset outcome, it did not result in an award of a portion of the partially complete bonus-game asset 150*c*. Thus, the partially complete bonus-game asset 150*c* and the percent complete indicator 151*c* remain unchanged.

Referring specifically to FIG. 6D, the primary display 114*d* illustrates a randomly selected outcome 120*d* of the basic wagering game, which is not a winning outcome and not a bonus-game-asset outcome. The secondary display 116*d* displays an outline or wire frame of a partially complete bonus-game asset 150*d* because the partially complete bonus-game asset 150*d* is 0% complete as indicated by a percent complete indicator 151*d*. As the outcome 120*d* was not a winning outcome, it did not result in an award of credits, as shown in the paid meter 72. Additionally, as the outcome 120*d* was not a bonus-game-asset outcome, it did not result in an award of a portion of the partially complete bonus-game asset 150*d*. Thus, the partially complete bonus-game asset 150*d* and the percent complete indicator 151*d* remain unchanged.

Referring to FIG. 6E, when plays of the basic wagering game are conducted (e.g., as plays of the basic wagering game are conducted in reference to FIGS. 1-3 and as described above) at one or more of the gaming terminals 110*a-d* of the gaming system 100, the overhead display 200 can be used to display the four fleets or inventories of bonus-game assets 215*a-d* for the respective four players of each of the four respective gaming terminals 110*a-d*. As such, the overhead display 200 is split into four portions 210*a-d*. A first portion 210*a* of the overhead display 200 is dedicated to displaying "Fleet 1," which corresponds to the bonus-game assets in a first inventory of bonus-game assets 215*a* of a first player of the first gaming terminal 110*a*. Similarly, a second portion 210*b* of the overhead display 200 is dedicated to displaying "Fleet 2," which corresponds to the bonus-game assets in a second inventory of bonus-game assets 215*b* of a second player of the second gaming terminal 110*b*; a third portion 210*c* of the overhead display 200 is dedicated to displaying "Fleet 3," which corresponds to the bonus-game assets in a third inventory of bonus-game assets 215*c* of a third player of the third gaming terminal 110*c*; and a fourth portion 210*d* of the overhead display 200 is dedicated to displaying "Fleet 4," which corresponds to the bonus-game assets in a fourth inventory of bonus-game assets 215*d* of a fourth player of the fourth gaming terminal 110*d*.

The first fleet of assets 215*a* includes completed bonus-game assets collected by the first player of the first gaming terminal 110*a*. The second fleet of assets 215*b* includes completed bonus-game assets collected by the second player of the second gaming terminal 110*b*. The third fleet of assets 215*c* includes completed bonus-game assets collected by the third player of the third gaming terminal 110*c*. The fourth fleet of assets 215*d* includes completed bonus-game assets collected by the fourth player of the fourth gaming terminal 110*d*.

The first fleet of assets 215*a* includes a 1× bonus-game asset, a 2× bonus-game asset, a 3× bonus-game asset, and a 5× bonus-game asset. The second fleet of assets 215*b* includes a 1× bonus-game asset, a 2× bonus-game asset, and a 3× bonus-game asset. The third fleet of assets 215*c* includes a 1× bonus-game asset and a 5× bonus-game asset. The fourth fleet of assets 215*d* includes a 1× bonus-game asset.

The partially complete bonus-game assets 150*a-d* in FIGS. 6A-6D are not available to be used in the community bonus game by players of the respective gaming terminals 110*a-d* unless they are 100% completed during play of the basic wagering game and, thus, stored in the respective player's fleet or inventory of bonus-game assets 215*a-d*, such as represented on the overhead display 200. Responsive to a bonus-game asset being completed during play of the basic wagering game, the bonus-game asset is stored in a corresponding fleet or inventory of the player. For example, when the first player completes the partially complete bonus-game asset 150*a*, the completed bonus-game asset will be stored in Fleet 1 on the overhead display 200. As shown, the partially complete bonus-game asset 150*a* is 99% complete and, thus, is not stored in Fleet 1. For another example, when the third player completes the partially complete bonus-game asset 150*c*, the completed bonus-game asset will be stored in Fleet 3 on the overhead display 200. As shown, the partially complete bonus-game asset 150*c* is 50% complete and, thus, is not stored in Fleet 3.

As described herein, each bonus-game-asset symbol 122 included in a bonus-game-asset outcome results in a portion of a bonus-game asset being awarded. The size of the awarded portion of the bonus-game asset is a predetermined percentage of the partially complete bonus-game asset. The predetermined percentage can be, for example, one percent, four percent, five percent, six percent, ten percent, twenty-five percent, etc. That is, for each bonus-game-asset symbol 122 included in a bonus-game-asset outcome, the player is awarded a predetermined percentage of the partially complete bonus-game asset.

For example, if the predetermined percentage is five percent, then if two bonus-game-asset symbols 122 are present, as shown in FIG. 6B, a predetermined percentage of ten percent completion of the partially complete bonus-game asset 150*b* will be awarded. Accordingly, the percent complete indicator 151*b* can be increased from 80% to 90% and the display of the partially complete bonus-game asset 150*b* on the secondary display 116*b* can be modified to display 10% more of the partially complete bonus-game asset 150*b*.

For another example, if the predetermined percentage is 6%, then if four bonus-game-asset symbols 122 are present (not shown), a predetermined amount of twenty-four percent completion of the partially complete bonus-game asset (not shown) will be awarded.

The size of the awarded portion of the bonus-game asset can further depend on an amount of a player's wager and/or wager-per-payline when the bonus-game-asset symbol 122 appears in an outcome. For example, if the player wagers on two or more paylines (not just one payline), the size of the awarded portion for each displayed bonus-game-asset symbol 122 can be increased. In such an exemplary example, the predetermined percentage can be increased, for example, from 5% to 7% for each bonus-game-asset symbol 122.

For another example, if the player wagers more than a minimum amount on one or more paylines the size of the awarded portion can be increased. In such an exemplary example, if the basic wagering game includes 40 paylines with a minimum bet of 1 cent per payline, a player playing all 40 paylines will need to wager a minimum of 40 cents per play of the basic wagering game. If the player wagers 2 cents per payline (twice the minimum wager-per-payline) or 80 cents per play of the basic wagering game, the awarded portion can be doubled (twice the predetermined percentage).

Similarly, if the player wagers 10 cents per payline (ten times the minimum wager-per-payline) or $4.00 per play of the basic wagering game, the awarded portion can be multiplied by ten (ten times the predetermined percentage). That is, if the predetermined percentage for each bonus-game-asset symbol 122 appearing in a bonus-game-asset outcome of the basic wagering game is five percent, a wager of $4.00 in the basic wagering game that results in a bonus-game-asset outcome with one bonus-game-asset symbol 122 will result in the player being awarded fifty percent (10×5%=50%) of the partially complete bonus-game asset.

As described above, the primary display 114*a-d* and the secondary display 116*a-d* of each gaming terminal 110*a-d* in the gaming system 100 can be used to display various portions of the basic wagering game and/or the community bonus game. The basic wagering game is conducted until a bonus-game triggering condition occurs. The bonus-game triggering condition is a randomly generated condition that causes a first play of the community bonus game to be conducted such that the players of the gaming terminals 110*a-d* can play the community bonus game if eligible. In one example, for a player to be eligible to play the community bonus game, the player must have collected or achieved one or more bonus-game assets in the player's fleet. As shown in FIG. 6E, each of the players has at least one bonus-game asset, thus, all four players are eligible to play the community bonus game when triggered. Had one of the players of the gaming terminals 110*a-d* not collected at least one bonus-game asset in a respective inventory or fleet, that player would not be eligible to play the community bonus game. In such an example, the eligible players would go on to play the community bonus game and the non-eligible player could continue to play the basic wagering game.

Figure 7:
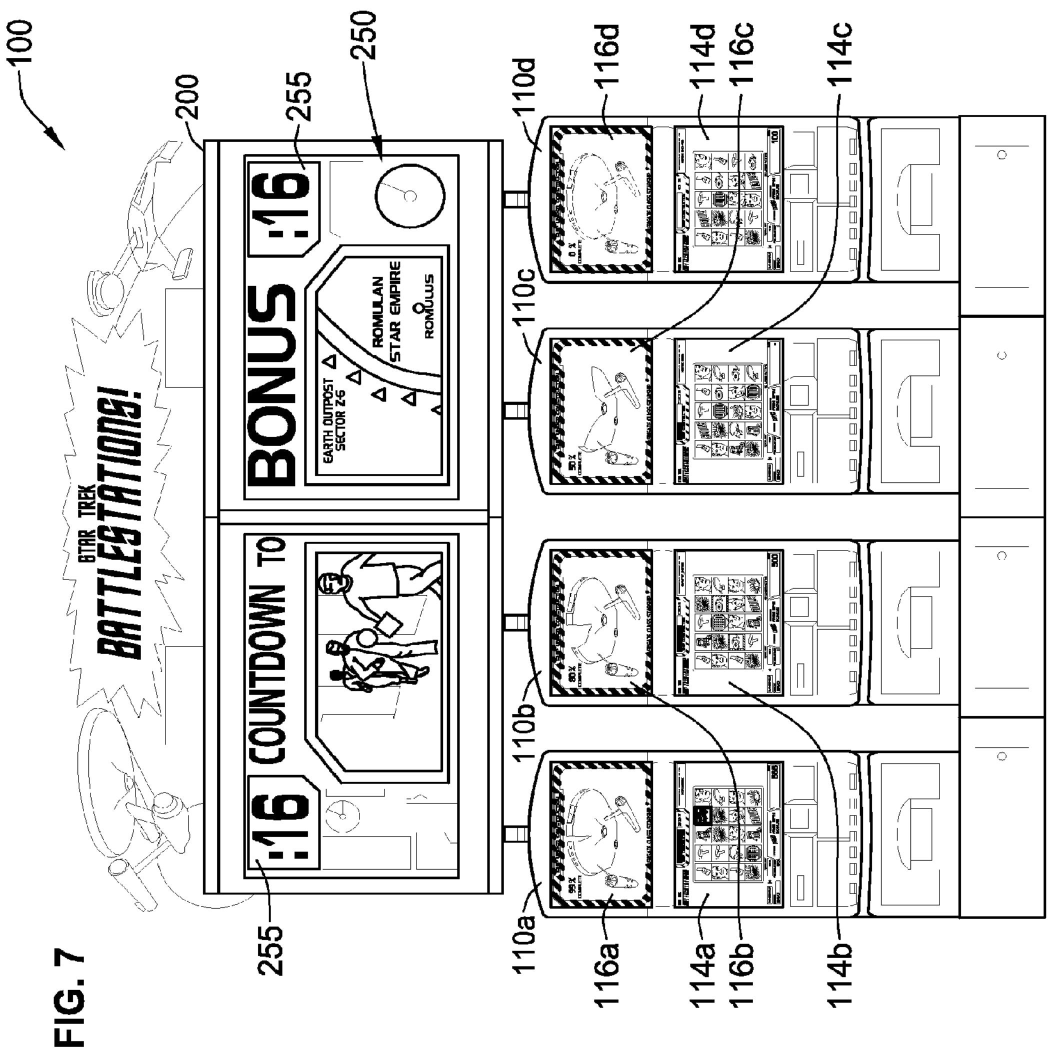
FIG. 7 is a front view of the free-standing gaming system of FIG. 5 displaying a countdown-to-bonus feature on the overhead display of the gaming system according to an embodiment of the present disclosure.

Referring to FIG. 7, in response to the random bonus-game triggering condition occurring and prior to conducting the first play of the community bonus game, an optional countdown-to-bonus feature 250 can be displayed on the overhead display 200 and/or on one or more of the primary display 114*a-d* and the secondary display 116*a-d*. The countdown-to-bonus feature 250 includes a display of one or more timers 255 that indicate that the first play of the community bonus game will begin in a predetermined amount of time, such as, for example, 30 seconds, 20 seconds, 16 seconds, 10 seconds, etc. Once the countdown-to-bonus feature 250 is displayed, the players of the gaming system 100 are made aware that the community bonus game is about to start and that any incomplete bonus-game assets 150*a-d* should be completed if the player wants to be able to use the bonus-game asset in the upcoming play of the community bonus game. Thus, the player is encouraged to play the basic wagering game faster to attempt to complete any incomplete or nearly complete bonus-game assets 150*a-d* displayed on the secondary displays 116*a-d*. The player is allowed to continue play of the basic wagering game until the timer 255 counts down from the predetermined number to zero. When the countdown timer reaches zero the play of the community bonus game is conducted.

As described above, responsive to a bonus-game asset being awarded or completed, the bonus-game asset is stored in an inventory or fleet, such as shown in FIG. 6E. Each of the bonus-game assets described herein and stored in the fleets of bonus-game assets 215*a-d* can be used by the players of the gaming terminals 110*a-d* during the community bonus game to enhance community bonus game awards earned by the players of the respective gaming terminals 110*a-d*, such as, for example, by applying a multiplier to an award of credits in the community bonus game. That is, for each play of the community bonus game, each player will get the opportunity to use each bonus-game asset stored in the player's fleet to enhance a community bonus game award. Thus, the more bonus-game assets in a player's fleet, the more opportunities the player will have to win and enhance a community bonus game award for each play of the community bonus game.

The fleets of bonus-game assets 215*a-d* are capable of storing a variety of different types of assets. The various types of bonus-game assets (1×, 2×, 3×, 5×, 10×, etc.) in the fleets of bonus-game assets 215*a-d* correspond with different levels of the bonus-game assets. Each level of a bonus-game asset is associated with a different multiplier (1×, 5×, 10×, etc.). As a bonus-game asset is promoted from level-to-level, a multiplier associated with the bonus-game asset increases. Thus, a bonus-game asset at a second level is associated with a multiplier that is higher than a multiplier associated with a bonus-game asset at a first level. Similarly, a bonus-game asset at a tenth level is associated with a multiplier that is higher than a multiplier associated with a bonus-game asset at a fifth level, etc.

When a bonus-game asset is initially stored in an inventory or fleet, it is stored at the first level and automatically associated with a 1× multiplier. Each time a bonus-game asset survives a play of the community bonus game (e.g., is available for a subsequent play of the community bonus game), as will be explained below in reference to FIG. 12, the bonus-game asset is promoted to the next level and associated with a larger multiplier. For example, if a bonus-game asset at the first level survives a first play of the community bonus game, the bonus-game asset will be promoted to the second level and associated with a 2× multiplier for use in a second play of the community bonus game at the second level. Similarly, if the same bonus-game asset survives a second play of the community bonus game, the bonus-game asset will be promoted to a third level and associated with a 3× multiplier for use in a third play of the community bonus game at the third level. Such promotions can continue so long as the bonus-game asset continues to survive (remains available) subsequent plays of the community bonus game. If the bonus-game asset does not survive (is unavailable) one of the plays of the community bonus game, the bonus-game asset is removed from the inventory or fleet and will no longer be usable by the player to enhance the community bonus game awards. Whether or not a bonus-game asset survives a play of the community bonus game and is available for a subsequent play is based on a random determination of one or more processors and/or the random outcome of the current play of the community bonus game.

Referring generally to FIGS. 8A-12, one cycle or play of the community bonus game will be described in reference to the first gaming terminal 110*a* and the associated first fleet of bonus-game assets 215*a*. However, it is understood that, because the players of the second, the third, and the fourth gaming terminals 110*b-d* are also eligible for the first play of the community bonus game, each of those gaming terminals 110*b-d* can similarly conduct and/or display the same or similar screenshots of the community bonus game as described below in reference to the first gaming terminal 110*a*.

Figure 8A:
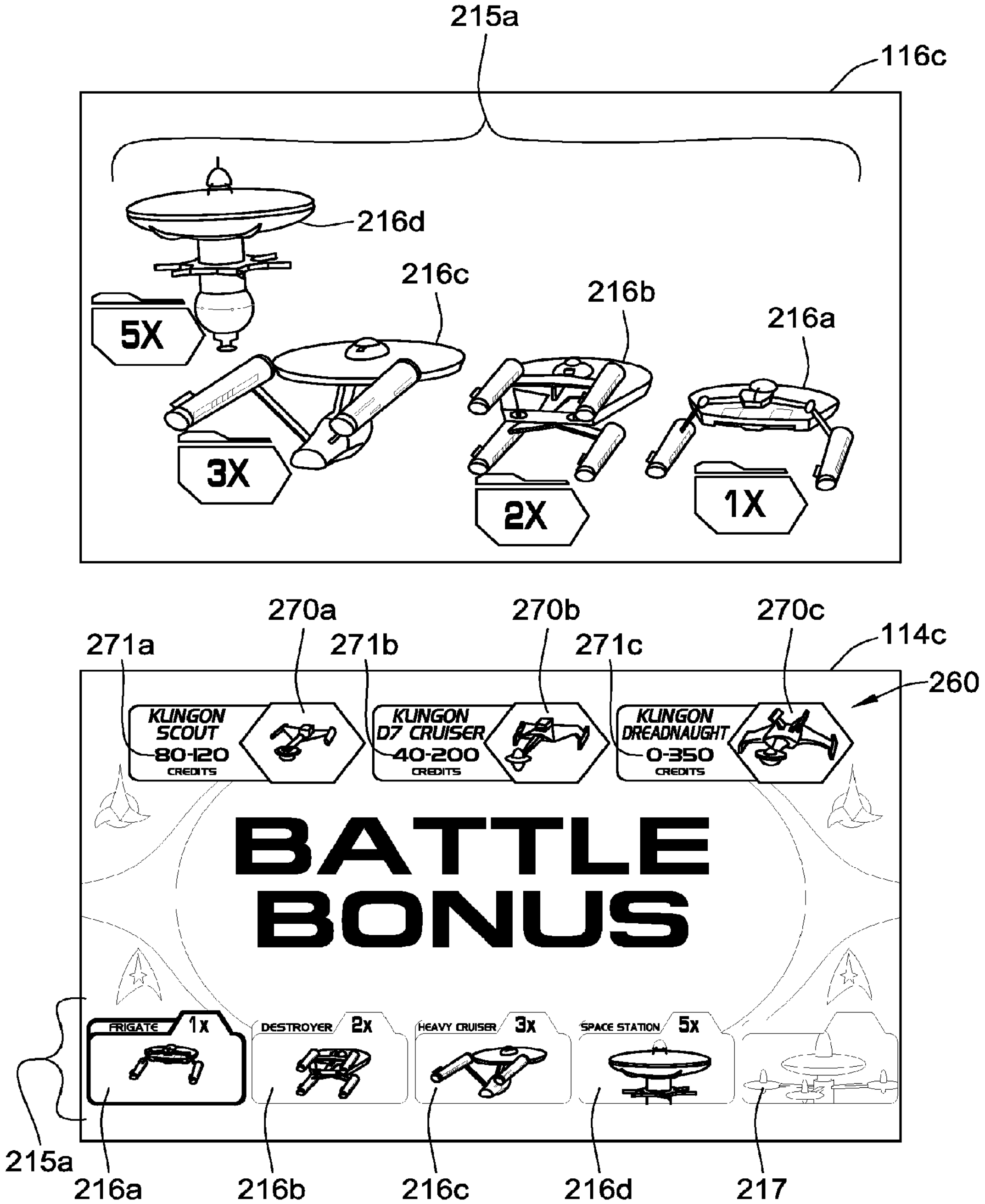
FIG. 8A is an image of an exemplary bonus-game screenshot on the primary display of the first gaming terminal of the gaming system of FIG. 5 and an exemplary image of a first one of the four fleets of bonus-game assets on the secondary display of the first gaming terminal of the gaming system of FIG. 5.

Referring to FIG. 8A, in response to the community bonus game being triggered, the primary display 114*a* of the first gaming terminal 110*a* displays an exemplary introductory "battle bonus" screenshot 260 for a predetermined amount of time that indicates to the first player that the first player has entered the community bonus game, which is about to begin. The introductory "battle bonus" screenshot 260 includes a representation of the first player's fleet of bonus-game assets 215*a* and a representation of three groups of player-selectable elements 270*a-c*.

The representation of the first player's fleet of bonus-game assets 215*a* includes a representation of a first available bonus-game asset 216*a* at a first level, a second available bonus-game asset 216*b* at a second level, a third available bonus-game asset 216*c* at a third level, a fourth available bonus-game asset 216*d* at a fifth level, and a fifth unavailable bonus-game asset 217. The first, the second, the third, and the fourth available bonus-game assets 216*a-d* correspond to the bonus-game assets in the first inventory of bonus-game assets 215*a* discussed above. The second, the third, and the fourth available bonus-game assets 216*b-d* are at levels higher than the first level because, for example, they were previously promoted one or more times to their respective levels at the current play of the community bonus game.

The fifth unavailable bonus-game asset 217 is displayed as a wire frame or shell to illustrate that a fifth type (e.g., 10× bonus-game asset) of bonus-game asset is achievable via promotion, but has not yet been achieved by the first player of the first gaming terminal 110*a* and, thus, not included in the first player's inventory or fleet of bonus-game assets 215*a*. However, if, for example, the fourth available bonus-game asset 216*d* survives the first play of the community bonus game and is promoted, the fourth available bonus-game asset 216*d* can be altered from the fifth level to a higher level, such as, for example, a tenth level associated with a 10× multiplier, for use in a second play of the community bonus game. That is, promoted bonus-game assets can skip levels during promotion (e.g., fifth level to tenth level, or third level to fifth level, etc.).

The representation of the first available bonus-game asset 216*a* at the first level is highlighted (bolded) to indicate that the first available bonus-game asset 216*a* is selected for use first in the first play of the community bonus game. Such a selection can be made, for example, by the first player, via a input device, or made automatically by the gaming terminal 110*a*. After the first available bonus-game asset 216*a* is used and a decision as to whether the first available bonus-game asset 216*a* is available or unavailable for a subsequent play of the community bonus game, the player or the gaming terminal 110*a* can select the next bonus-game asset in the player's fleet 215*a* for use during the same first play of the community bonus game. That is, each of the bonus-game assets in the first fleet of bonus-game assets 215*a* is used during the first play of the community bonus game.

The representation of three groups of player-selectable elements 270*a-c* includes a representation of a first group of player-selectable elements 270*a* associated with a first bonus award range (80-120 credits) 271*a*, a representation of a second group of player-selectable elements 270*b* associated with a second bonus award range (40-200 credits) 271*b*, and a representation of a third group of player-selectable elements 270*c* associated with a third bonus award range (0-350 credits) 271*c*. As described below in reference to FIG. 9, the first player is prompted to select one of the groups 270*a-c* via an input device, such as, for example, a touch screen.

In addition to the primary display 114*a* displaying the introductory "battle bonus" screenshot 260, the secondary display 116*a* displays a representation of the first fleet of bonus-game assets 215*a* in a similar fashion as previously represented on the first portion 210*a* of the overhead display 200.

Figure 8B:
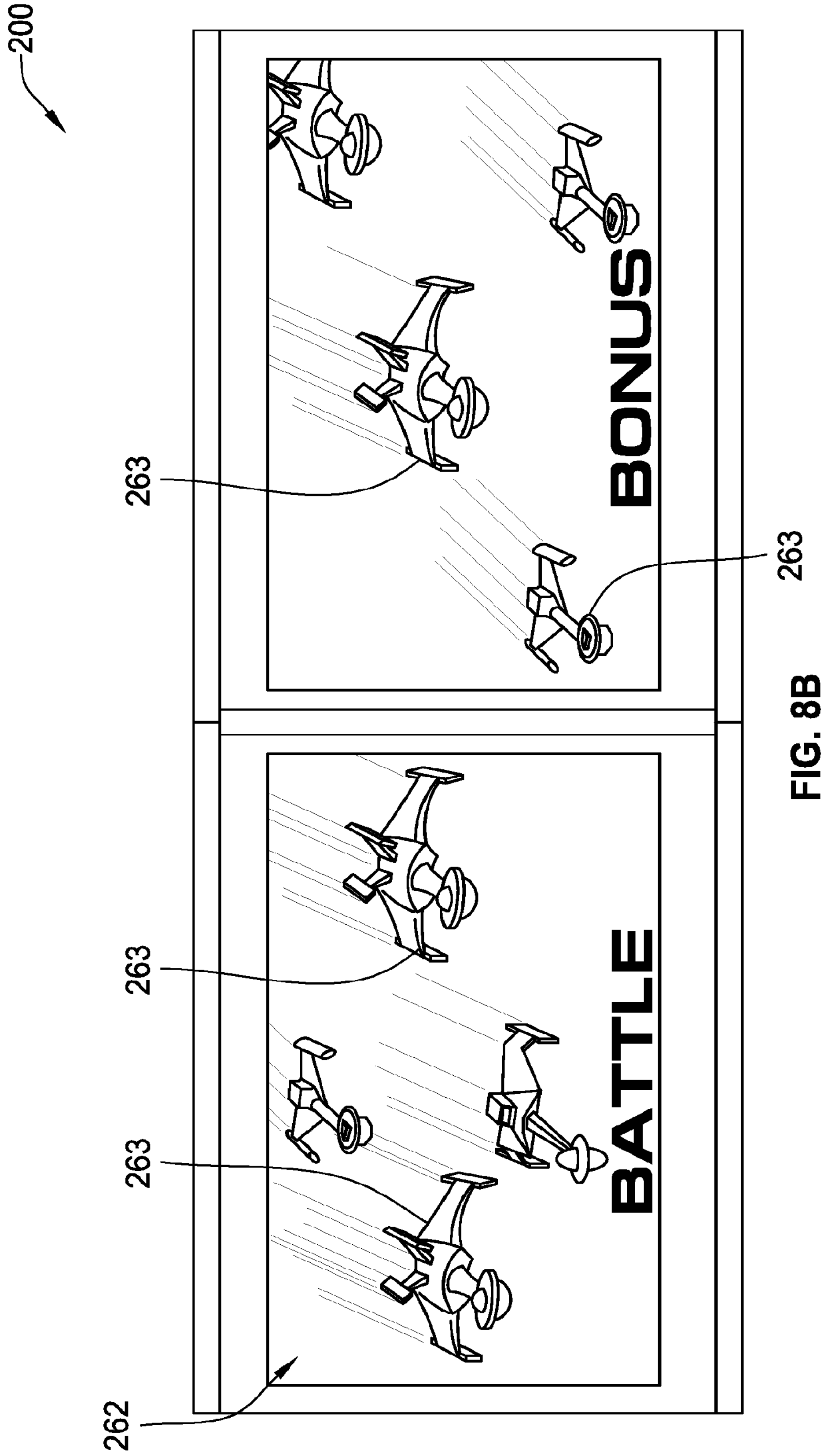
FIG. 8B is an image of a bonus-game introductory screenshot on the overhead display of the gaming system of FIG. 5 according to an embodiment of the present disclosure.

Referring to FIG. 8B, in response to the community bonus game being triggered, the overhead display 200 of the gaming system 100 can optionally display an exemplary introductory "battle bonus" screenshot 262 that indicates to all of the players of the gaming system 100 that the community bonus game has been triggered and is about to begin. The introductory "battle bonus" screenshot 262 can illustrate a multitude of enemy assets 263 approaching to be attacked/engaged by the bonus-game assets in the player's respective fleets 215*a-d*. The display of the introductory "battle bonus" screenshot 262 can further add to the players' excitement and entertainment while playing the community bonus game.

Figure 9:
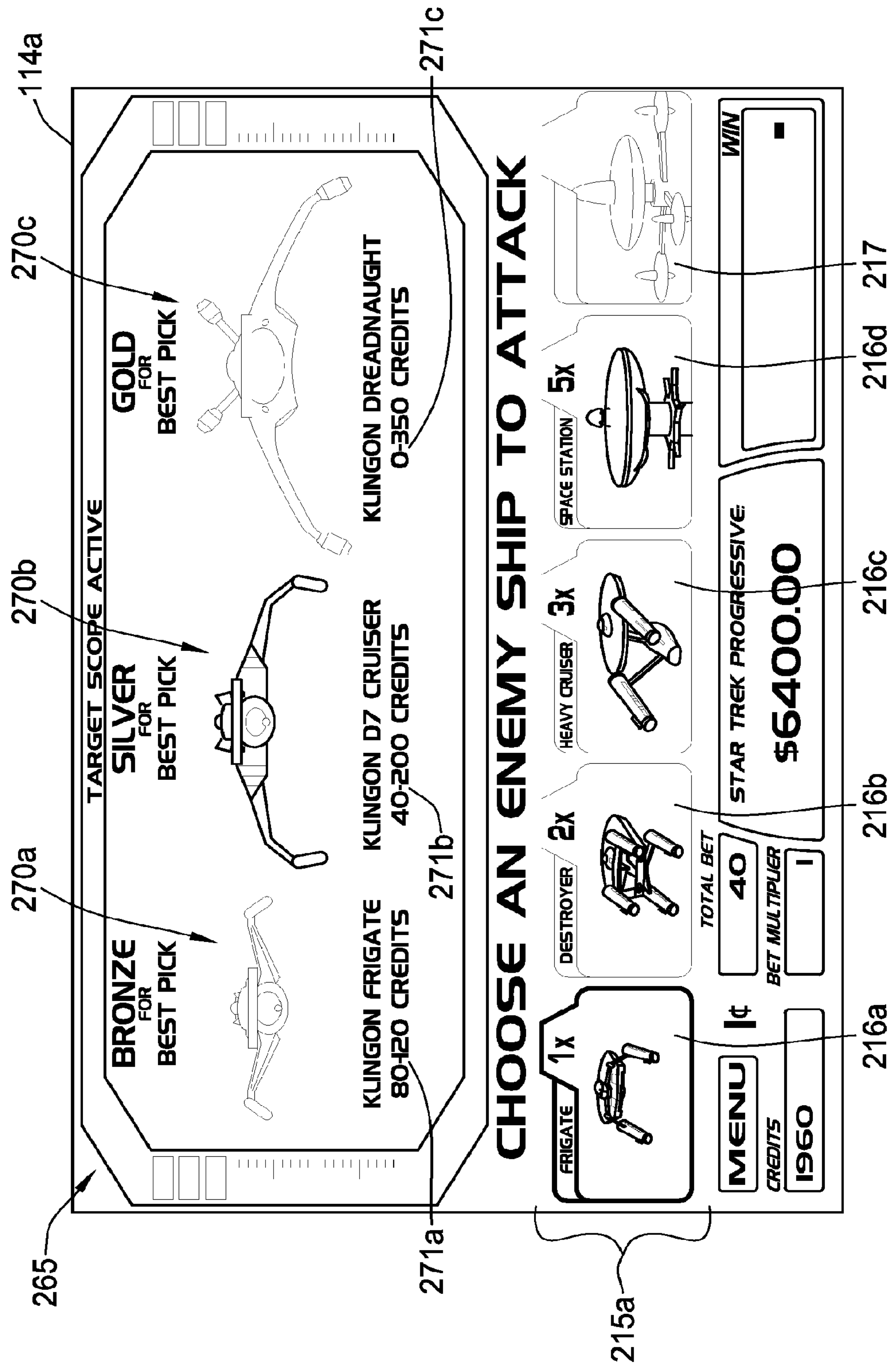
FIGS. 9-11 are images of exemplary community-bonus-game screenshots on the primary display of the first gaming terminal of the gaming system of FIG. 5.

Referring to FIG. 9, in response to the community bonus game being triggered and the introduction of the bonus being complete, the primary display 114*a* displays an exemplary group selection screenshot 265 that indicates to the first player that the first player should select one of the three groups of player-selectable elements 270*a-c*. In the illustrated example the first player selects the second group of player-selectable elements 270*b*, which is highlighted (bolded) to indicate that it was selected. Thus, the first player will be eligible to win between 40 and 200 credits during the first play of the community bonus game, which will be enhanced by the 1× multiplier associated with the first available bonus-game asset 216*a*. Had the first player selected the first group of player-selectable elements 270*a*, the first player would have been eligible to win between 80 and 120 credits. Similarly, had the first player selected the third group of player-selectable elements 270*c*, the first player would have been eligible to win between 0 and 350 credits. Thus, the player perceives the ability to determine the volatility of the potential community bonus game awards, which adds excitement and anticipation to the community bonus game.

Figure 10:
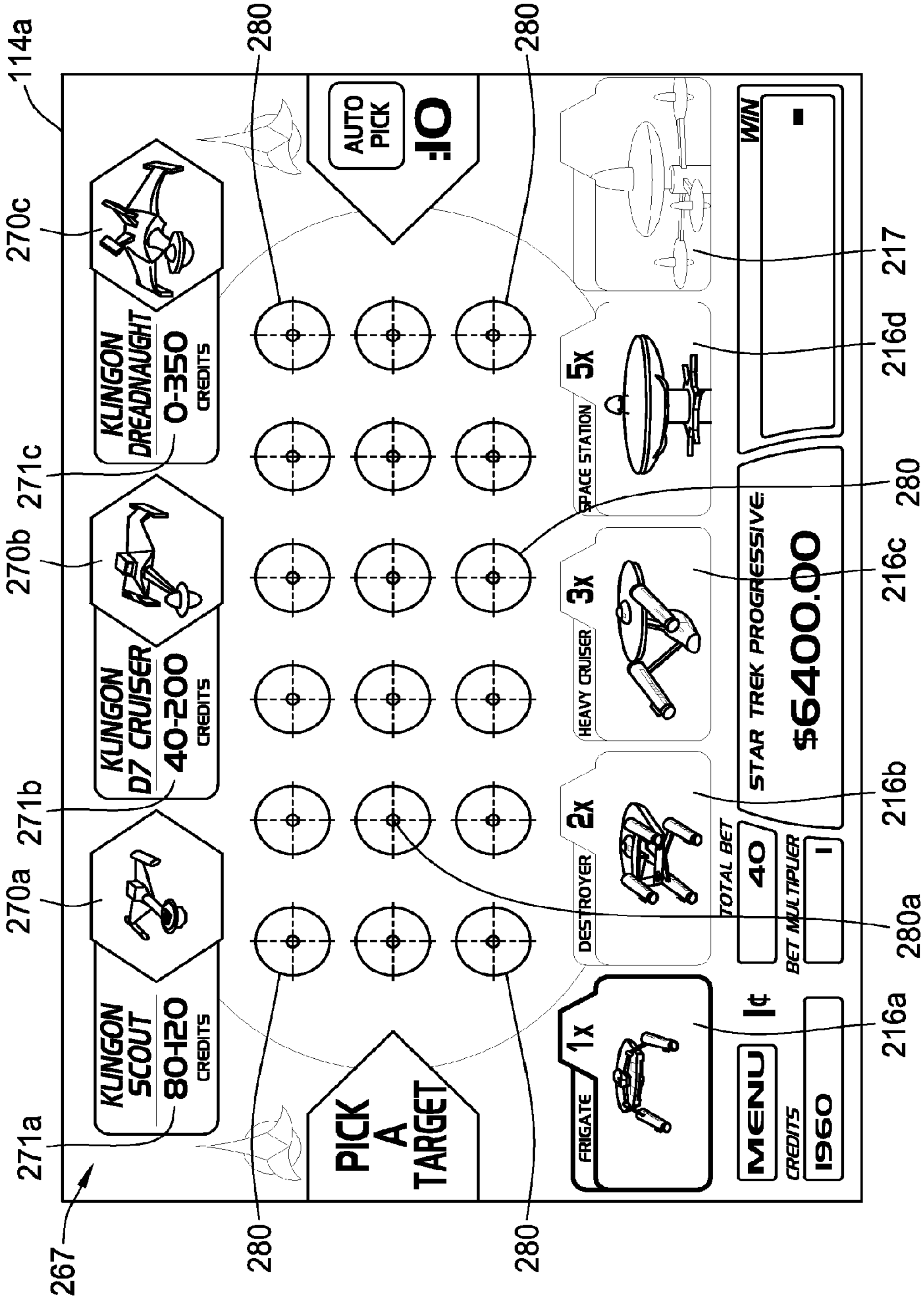

Referring to FIG. 10, in response to the player selecting one of the second group of player-selectable elements 270*b*, the primary display 114*a* displays an exemplary target selection screenshot 267 that indicates to the first player that the first player should select one of a multitude of player-selectable elements or targets 280. Each one of the player-selectable elements or targets 280 is associated with a bonus award included in the second bonus award range 271*b* (between 40 and 200 credits). In the example, the first player selects one of the targets 280*a*. Had the player not made a selection within a predetermined amount of time (e.g., 10 seconds), an automatic selection would have been made for the player to keep the community bonus game progressing.

Figure 11:
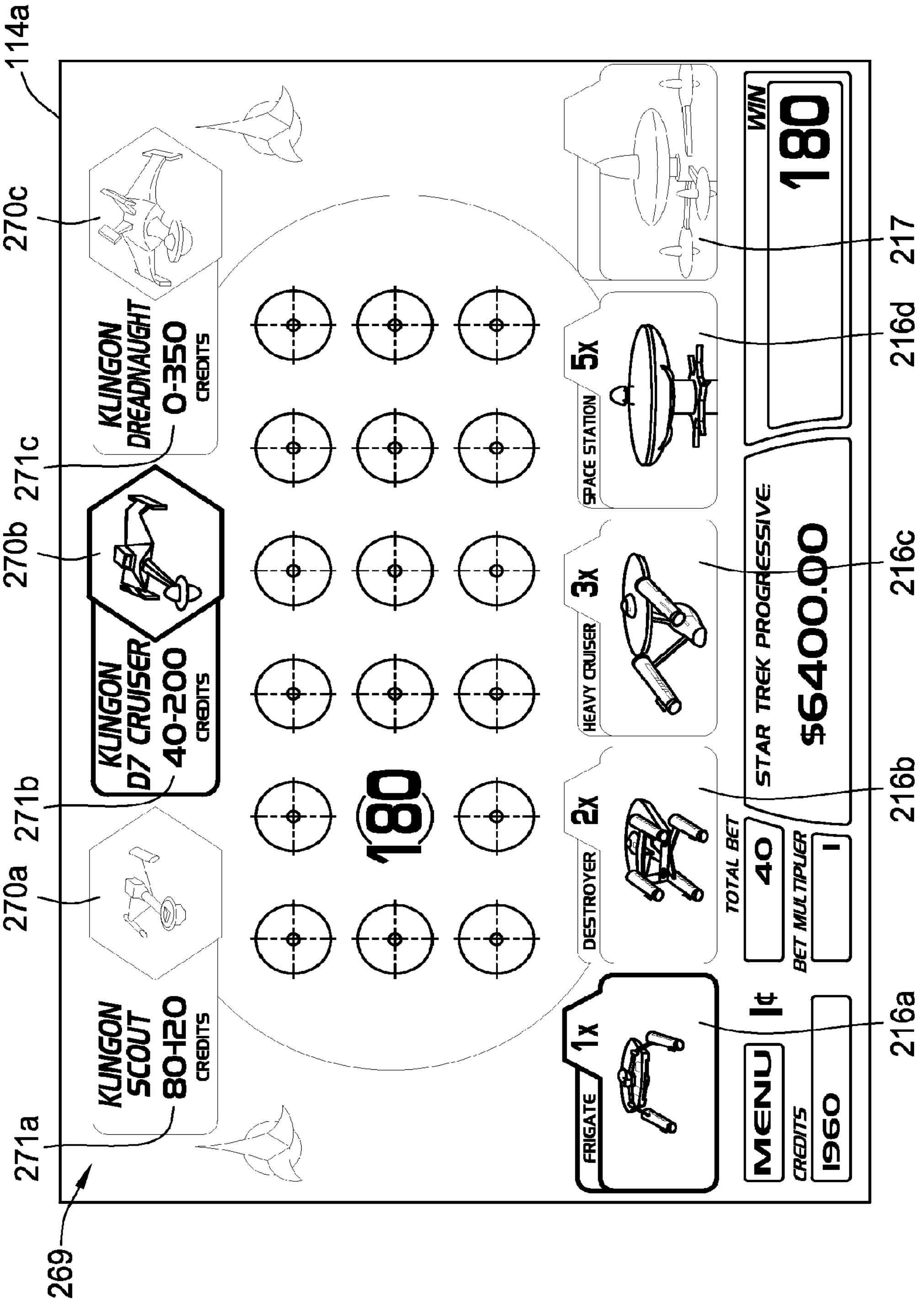

Referring to FIG. 11, in response to the first player selecting the target 280*a*, the primary display 114*a* displays a bonus-award screenshot 269, which indicates to the first player that the selected one 280*a* of the player-selectable elements 280 was associated with a bonus award of one hundred and eighty (180) credits.

In addition to awarding the first player one hundred and eighty (180) credits, the bonus award is enhanced by the multiplier associated with the bonus-game asset being used by the player. In the exemplary example, the bonus-game asset currently being used by the first player is the first available bonus-game asset 216*a* at the first level, which is associated with a multiplier of 1×. Thus, the bonus award of one hundred and eighty (180) credits is enhanced by the 1× multiplier and the enhanced bonus award is awarded to the first player. It is understood that a 1× multiplier does not increase the bonus award in this example, but when other bonus-game assets are used by the player in the first play of the community bonus game at higher levels (e.g., the second level), the bonus award will be enhanced/increased.

In addition to awarding the first player the enhanced bonus award, the gaming terminal 110*a*, the gaming system 100, and/or a communicatively connected processor determines whether or not the first available bonus-game asset 216*a* will be promoted to the next level and, thus, be available for use by the first player in a subsequent play of the community bonus game at that higher level. In the exemplary example, it is determined that the first available bonus-game asset 216*a* survived the first play of the community bonus game such that it will be promoted/altered prior to the conclusion of the first play of the bonus game. That is, according to some aspects of the present disclosure, one of the enemy assets 263 did not destroy the first available bonus-game asset 216*a* during the first play of the community bonus game.

A graphical representation of a battle between the enemy asset(s) 263 and the first available bonus-game asset 216*a* can be displayed on the overhead display 200, the primary display 114*a*, the secondary display 116*a*, or a combination thereof. For example, in the exemplary embodiment, a graphical representation of the first available bonus-game asset 216*a* shooting at one of the enemy assets 263 and the enemy asset 263 blowing up can be shown in addition to a graphical representation of the first available bonus-game asset 216*a* being shot at and a protection shield being employed to block the shot, thereby protecting the first available bonus-game asset 216*a* such that the first available bonus-game asset 216*a* remains available for a subsequent play of the community bonus game at the second level.

After the graphical representation of the battle between the enemy asset(s) 263 and the first available bonus-game asset 216*a*, the above described cycle (FIGS. 9-11) repeats for the second available bonus-game asset 216*b*, etc. until all of the available bonus-game assets 216*a-d* are used in the first play of the community bonus game. Accordingly, the more bonus-game assets held by a player, the more chances the player is given to win community-bonus-game awards in the community bonus game. And, assets with higher levels can achieve even higher awards.

Figure 12:
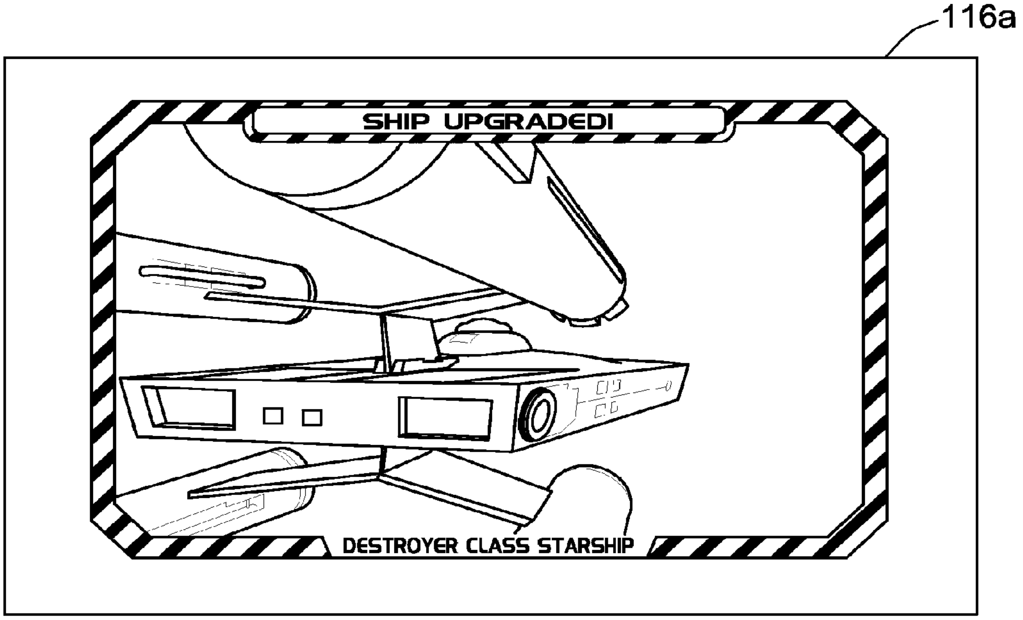
FIG. 12 is an image of exemplary community-bonus-game screenshots on the primary display and the secondary display of the first gaming terminal of the gaming system of FIG. 5 illustrating the promotion of a bonus-game asset from a first level to a second higher level.
Figure 12:
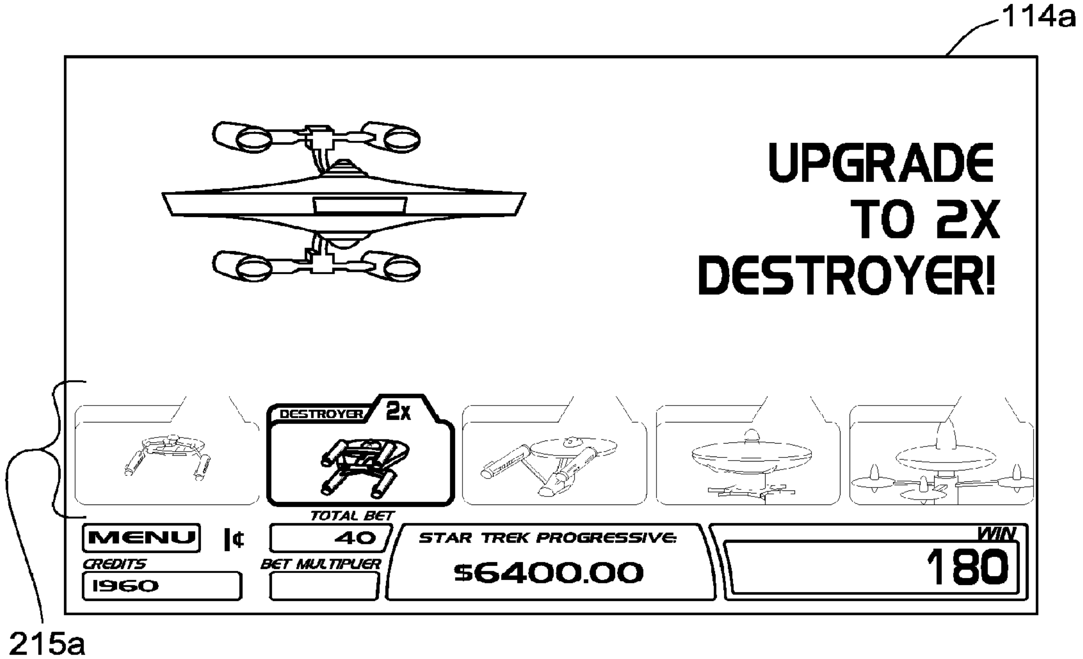

Referring to FIG. 12, in response to the determination that one or more of the available assets 216*a-d* survive the first play of the community bonus game, both the primary and the secondary displays 114*a*, 116*a* illustrate that the available bonus-game assets, one at a time, are upgraded. For example, in the illustrated example, only the first available bonus-game asset 261*a* is determined to have survived the first play of the bonus game, thus the first available bonus-game asset 216*a* is promoted from the first level (associated with a 1× multiplier) to the second level, which is associated with a 2× multiplier. That is, the level of the first available bonus-game asset 216*a* is altered from the first level to the second level such that the first available bonus-game asset 216*a* is usable in a subsequent play of the community bonus game at the second level. Thus, during the subsequent play of the community bonus game, the first player will at least have use of one bonus-game asset at the second level.

As the first available bonus-game asset 216*a* was upgraded to the second level and the second, the third, and the fourth available bonus-game assets 216*b-d* were determined to be unavailable for the subsequent play of the community bonus game, only the first available bonus-game asset 216*a* is stored in the first fleet of bonus-game assets 215*a* at the second level. That is, the first player no longer has a bonus-game asset at the first level, the third level, or the fifth level in the first fleet of bonus-game assets 215*a* after the first play of the community bonus game concludes. As such, the representation of the first fleet of bonus-game assets 215*a* is modified, such as by displaying the first, the third, and the fifth levels of bonus-game assets as wire frames or shells to illustrate that the first type, the third type, and the fourth type (e.g., 1×, 3×, and 5× bonus-game assets) of bonus-game assets are no longer available.

After all of the available bonus-game assets 216*a-d* are used in the first play of the community bonus game, and after the first available bonus-game asset 216*a* is promoted, the community bonus game ends and the basic wagering game resumes with the first fleet of bonus-game assets 215*a* only including the one available bonus-game asset 216*a* at the second level.

After the community bonus game is triggered again, during a second play of the community bonus game, the first player can use the same available bonus-game asset 216*a* used and described above in the first play; however, in the second play, the bonus-game asset 216*a* will be used at the second level. That is, after the first play of the community bonus game concludes and the first player resumes regular play of the basic wagering game, the community bonus game will be randomly triggered again. In response to second random triggering, a second play of the community bonus game will be conducted. During the second play, the first player can use the same asset 216*a* that the first player used in the first play, but now at the second level, which is associated with a 2× multiplier that will enhance a community bonus award achieved by the first player during the second play of the community bonus game. As the player may have also achieved additional or new bonus-game assets in the basic wagering game, the second play of the community bonus game also allows the player to use any additional or new bonus-game assets as described herein at the first level.

While the basic wagering game is shown and described above as a slot-type wagering game, it is contemplated that the basic wagering game can be a variety of other type of wagering games, such as, for example, keno, poker, blackjack, roulette, craps, etc. In such alternative basic wagering games, the bonus-game assets can be awarded based on respective outcomes of the games, random determinations made by a processor or controller, etc.

While the gaming system 100 is shown as including four separate and distinct gaming terminals 110*a-d*, it is contemplated that the gaming system 100 can include a variety of different numbers of gaming terminals, such as, for example, one gaming terminal, two gaming terminals, three gaming terminals, ten gaming terminals, etc. For the example including only one gaming terminal, the community bonus game is no longer a community bonus game but rather just a bonus game played by a single player. Additionally, for the example including only one gaming terminal, the overhead display 200 can be excluded from the system 100.

While each gaming terminal 110*a-d* is shown and described as including a primary display 114*a-d* and a secondary display 116*a-d*, it is contemplated that each gaming terminal 110*a-d* can include more or less displays, such as, for example, one display, three displays, four displays, etc. In the examples where each gaming terminal includes only one display, the aspects of the basic wagering game and the aspects of the community bonus game can be displayed on the same and/or different portions of the single display.

It is contemplated that the overhead display 200 can include one or more abutting displays, such as, for example, one display, two displays, three displays, four displays, etc.

While the bonus-game-asset outcome is described as being indicated by the inclusion of one or more bonus-game-asset symbols 122 in an outcome of the basic wagering game, other manners for indicating bonus-game-asset outcomes are contemplated. For example, the portions or complete bonus-game assets can be awarded via a mystery event or trigger during the basic wagering game and/or during the community bonus game.

While initially achieved and stored bonus-game assets are described as being initially stored in the fleet at the first level and automatically associated with a 1× multiplier, it is contemplated that other initial levels and multipliers for the bonus-game asset can be automatically assigned and/or based on a player input. For example, in response to a player completing a bonus-game asset, according to some alternative aspects of the present disclosure, a random determination of storing the bonus-game asset at the fifth level and associated with a multiplier of 5× can be made randomly by one or more processors. For another example, in response to a player completing a bonus-game asset, according to some alternative aspects of the present disclosure, a set of player-selectable elements can be displayed on one of the displays with a prompt for the player to select an element, wherein the selected element reveals the level and associated multiplier of the bonus-game asset.

While it is described above in reference to FIG. 9 that a player is prompted to select one of the three groups of player-selection elements 270*a-c*, it is contemplated that such a selection can be made automatically by one or more processors as a random selection.

Depending on the status of game play on the four gaming terminals 110-*a-d*, the overhead display 200 can used to display a variety of images. For example, when no players are playing the basic wagering game or the community bonus game at the gaming system 100, the overhead display can be used to display an attract sequence, advertisements, etc. For another example, when one or more players are playing the basic wagering game at the gaming system 100 and the community bonus game is not being conducted, the overhead display 200 can be used to display the inventories or fleets of bonus-game assets 215*a-d* of the players of the gaming terminals 110*a-d* (FIG. 6E). For another example, when the community bonus game is triggered, the overhead display 200 can be used to display the countdown-to-bonus feature 250 (FIG. 7). For another example, when the countdown-to-bonus feature reaches zero, the overhead display 200 can be used to display the bonus-game introductory scene 262 (FIG. 8B).

While the fleets of bonus-game assets 215*a-d* are described as being displayed on the overhead display 200 during play of the basic wagering game and on the secondary displays 116*a-d* during play of the bonus game, it is contemplated that the fleets of bonus-game assets 215*a-d* are not displayed during play of the basic wagering game and/or during play of the bonus game. It is further contemplated that the fleets of bonus-game assets 215*a-d* can be displayed on portions of the primary display 114*a-d*, the secondary display 114*a-d*, the overhead display 200, other displays, or any combination.

It is contemplated that a player of the gaming system 100 can stop playing the basic wagering game and save any previously achieved and stored bonus-game assets in their current status (i.e., with the current promotion level) for use during a subsequent session of the basic wagering game and/or community bonus game. It is also contemplated that a player of the gaming system 100 can stop playing the basic wagering game and save the partially complete bonus-game asset 150*a-d* in its current status (i.e., with the current percentage complete) for use during a subsequent session of the basic wagering game and/or community bonus game. The assets can be stored on a remote memory device that the player can later access to retrieve the assets, such as, for example, by logging into the gaming system 100 with a user name and/or password.

Each of the above aspects and embodiments of the present disclosure and obvious variations thereof is contemplated as falling within the spirit and scope of the claimed invention, which is set forth in the following claims.

What is claimed is:

1. A method of operating a gaming system, the gaming system including one or more controllers and a plurality of gaming terminals, each gaming terminal primarily dedicated to playing at least one respective casino wagering game and configured to participate in a community bonus game, the community bonus game permitting a player to use a bonus-game asset to modify a bonus game award, each gaming terminal including a display device, a value input device, and one or more other input devices, the method comprising:

detecting, via the value input device of a first one of the gaming terminals, a physical item that establishes a credit balance for the first gaming terminal;

initiating the casino wagering game at the first gaming terminal in response to an input indicative of a wager that is deducted from the credit balance;

in response to a bonus-game triggering condition, displaying, on (i) the display device of the first gaming terminal, (ii) an overhead display device, or (iii) both, a first play of the community bonus game including the bonus-game asset at a first level, the bonus-game asset at the first level being used by the player during the first play of the community bonus game;

in response to the first play of the community bonus game resulting in a winning outcome, (i) awarding a first bonus game award to the player and (ii) modifying the first bonus game award based on the bonus-game asset at the first level, thereby increasing the credit balance;

determining whether the bonus-game asset is available to the player for use in a second play of the community bonus game;

in response to the bonus-game asset being available to the player for use in the second play of the community bonus game, altering, via at least one of the one or more controllers, the bonus-game asset from the first level to a second level;

in response to another bonus-game triggering condition, displaying, on (i) the display device of the first gaming terminal, (ii) the overhead display device, or (iii) both, a second play of the community bonus game including the bonus-game asset at the second level, the bonus-game asset at the second level being used by the player during the second play of the community bonus game, the second level providing a higher bonus-game enhancement than the first level; and receiving, via at least one of the one or more other input devices of the first gaming terminal, a collect input that initiates a payout of the remaining credit balance.

2. The method of claim 1, further comprising, in response to the bonus-game asset not being available to the player for use in the second play of the community bonus game, removing the bonus-game asset from the player such that the player lacks the bonus-game asset in the second play.

3. The method of claim 1, wherein the bonus-game asset at the first level is a first multiplier, wherein displaying the first play of the community bonus game includes displaying the first bonus game award as a first amount of credits, and wherein the modifying the first bonus game award based on the bonus-game asset at the first level includes multiplying the first bonus game award by the first multiplier.

4. The method of claim 3, wherein the bonus-game asset at the second level is a second multiplier, wherein displaying the second play of the community bonus game includes displaying a second bonus game award as a second amount of credits, and wherein the use of the bonus-game asset by the player at the second level during the second play of the community bonus game includes multiplying the second bonus game award by the second multiplier, the second multiplier being larger than the first multiplier.

5. The method of claim 1, wherein the bonus-game asset is acquired by the player during play of the respective casino wagering game played on the respective gaming terminal, the respective casino wagering game being different from the community bonus game.

6. The method of claim 5, wherein the bonus-game triggering condition occurs while the player is playing the respective casino wagering game on the respective gaming terminal.

7. A method of operating a gaming system, the gaming system including one or more controllers and a plurality of gaming terminals that are primarily dedicated to playing respective basic casino wagering games that provide access to a community bonus game, each gaming terminal of the plurality of gaming terminals including a display device, a value input device, and one or more other input devices, the method comprising:

detecting, via the value input device of a first one of the gaming terminals, a physical item that establishes a credit balance for the first gaming terminal;

initiating the basic casino wagering game at the first gaming terminal in response to an input indicative of a wager that is deducted from the credit balance;

in response to a player of the first gaming terminal achieving a bonus-game-asset outcome in the respective basic casino wagering game, providing the player with a first portion of a bonus-game asset, the bonus-game asset including "n" portions that must be collected by the player to use the bonus-game asset;

in response to a first bonus-game triggering condition occurring when the player has not collected all of the "n" portions of the bonus-game asset, conducting a first play of the community bonus game without the player;

in response to the player achieving the bonus-game-asset outcome at a later time in the respective basic casino wagering game, providing the player with a second portion of the bonus-game asset such that the bonus-game asset is available for use by the player at a first level;

in response to a second bonus-game triggering condition occurring when the player has collected all of the "n" portions of the bonus-game asset, conducting a second play of the community bonus game in which the bonus-game asset is used by the player of the community bonus game at the first level, the bonus-game asset is either available or unavailable to the player for use in a third play of the community bonus game;

in response to the second play of the community bonus game resulting in a winning outcome, (i) awarding a first bonus game award to the player and (ii) modifying the first bonus game award based on the bonus-game asset at the first level, thereby increasing the credit balance;

in response to the bonus-game asset being available to the player for use in the third play of the community bonus game, altering, via the at least one of the one or more controllers, the level of the bonus-game asset from the first level to a second level such that the bonus-game asset is usable in the third play of the community bonus game at the second level, the second level providing a higher bonus-game enhancement than the first level; and receiving, via at least one of the one or more other input devices of the first gaming terminal, a collect input that initiates a payout of the remaining credit balance.

8. The method of claim 7, further comprising storing the first and the second portions of the bonus-game asset in a bonus-game-asset inventory of the player.

9. The method of claim 7, wherein "n" is five.

10. A gaming system comprising:

a plurality of gaming terminals primarily dedicated to playing at least one respective casino wagering game and that participate in a community bonus game, the community bonus game permitting a player to use a bonus-game asset to modify a bonus game award, a first one of the gaming terminals including:

a display device;

a value input; and one or more other input devices;

one or more controllers configured to:

detect, via the value input device, a physical item that establishes a credit balance for the first gaming terminal;

initiate the casino wagering game at the first gaming terminal in response to an input indicative of a wager that is deducted from the credit balance;

in response to a bonus-game triggering condition, display, on (i) the display device of the first gaming terminal, (ii) an overhead display device, or (iii) both, a first play of the community bonus game including the bonus-game asset at a first level, the bonus-game asset at the first level being used by the player during the first play of the community bonus game;

in response to the first play of the community bonus game resulting in a winning outcome, (i) award a first bonus game award to the player and (ii) modify the first bonus game award based on the bonus-game asset at the first level, thereby increasing the credit balance;

determine whether the bonus-game asset is available to the player for use in a second play of the community bonus game;

in response to the bonus-game asset being available to the player for use in the second play of the community bonus game, alter, via at least one of the one or more controllers, the bonus-game asset from the first level to a second level;

in response to another bonus-game triggering condition, display, on (i) the display device of the first gaming terminal, (ii) the overhead display device, or (iii) both, a second play of the community bonus game including the bonus-game asset at the second level, the bonus-game asset at the second level being used by the player during the second play of the community bonus game, the second level providing a higher bonus-game enhancement than the first level; and receive, via at least one of the one or more other input devices of the first gaming terminal, a collect input that initiates a payout of the remaining credit balance.

11. The gaming system of claim 10, wherein the one or more controllers are further configured to, in response to the bonus-game asset not being available to the player for use in the second play of the community bonus game, remove the bonus-game asset from the player such that the player lacks the bonus-game asset in the second play.

12. The gaming system of claim 10, wherein the bonus-game asset at the first level is a first multiplier, wherein the display of the first play of the community bonus game includes displaying the first bonus game award as a first amount of credits, and wherein the modifying the first bonus game award based on the bonus-game asset includes multiplying the first bonus game award by the first multiplier.

13. The gaming system of claim 12, wherein the bonus-game asset at the second level is a second multiplier, wherein the display of the second play of the community bonus game includes displaying a second bonus game award as a second amount of credits, and wherein the use of the bonus-game asset by the player at the second level during the second play of the community bonus game includes multiplying the second bonus game award by the second multiplier, the second multiplier being larger than the first multiplier.

14. The gaming system of claim 10, wherein the bonus-game asset is acquired by the player during play of the respective casino wagering game played on the respective gaming terminal, the respective casino wagering game being different from the community bonus game.

15. The gaming system of claim 14, wherein the bonus-game triggering condition occurs while the player is playing the respective casino wagering game on the respective gaming terminal.

16. A gaming system comprising:

a plurality of gaming terminals primarily dedicated to playing at least one respective basic casino wagering game that provide access to a community bonus game, a first one of the gaming terminals including:

a display device;

a value input device; and one or more other input devices;

one or more controllers configured to:

detect, via the value input device, a physical item that establishes a credit balance for the first gaming terminal;

initiate the casino wagering game at the first gaming terminal in response to an input indicative of a wager that is deducted from the credit balance;

in response to a player of the first gaming terminal achieving a bonus-game-asset outcome in the respective basic casino wagering game, provide the player with a first portion of a bonus-game asset, the bonus-game asset including "n" portions that must be collected by the player to use the bonus-game asset;

in response to a first bonus-game triggering condition occurring when the player has not collected all of the "n" portions of the bonus-game asset, conduct a first play of the community bonus game without the player;

in response to the player achieving the bonus-game-asset outcome at a later time in the respective basic casino wagering game, provide the player with a second portion of the bonus-game asset such that the bonus-game asset is available for use by the player at a first level;

in response to a second bonus-game triggering condition occurring when the player has collected all of the "n" portions of the bonus-game asset, conduct a second play of the community bonus game in which the bonus-game asset is used by the player of the community bonus game at the first level, the bonus-game asset being either available or unavailable to the player for use in a third play of the community bonus game;

in response to the second play of the community bonus game resulting in a winning outcome, (i) awarding a first bonus game award to the player and (ii) modifying the first bonus game award based on the bonus-game asset at the first level, thereby increasing the credit balance;

in response to the bonus-game asset being available to the player for use in the third play of the community bonus game, alter the level of the bonus-game asset from the first level to a second level such that the bonus-game asset is usable in the third play of the community bonus game at the second level, the second level providing a higher bonus-game enhancement than the first level; and receive, via at least one of the one or more other input devices of the first gaming terminal, a collect input that initiates a payout of the remaining credit balance.

17. The gaming system of claim 16, wherein the one or more controllers are further configured to store the first and the second portions of the bonus-game asset in a bonus-game-asset inventory of the player.

18. The gaming system of claim 16, wherein "n" is five.

* * * * *